United States Patent
Reynar et al.

(10) Patent No.: US 7,281,245 B2
(45) Date of Patent: *Oct. 9, 2007

(54) MECHANISM FOR DOWNLOADING SOFTWARE COMPONENTS FROM A REMOTE SOURCE FOR USE BY A LOCAL SOFTWARE APPLICATION

(75) Inventors: Jeff Reynar, Woodinville, WA (US); Paul Broman, Renton, WA (US); Brian Jones, Redmond, WA (US); Robert Little, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 442 days.

This patent is subject to a terminal disclaimer.

(21) Appl. No.: 10/164,260

(22) Filed: Jun. 5, 2002

(65) Prior Publication Data

US 2004/0003389 A1 Jan. 1, 2004

(51) Int. Cl.
*G06F 9/44* (2006.01)
(52) U.S. Cl. .................. 717/173; 717/169; 717/178
(58) Field of Classification Search ........ 717/168–178, 717/101–103, 120–123; 715/513, 748–749, 715/760, 826
See application file for complete search history.

(56) References Cited

U.S. PATENT DOCUMENTS

| | | | |
|---|---|---|---|
| 4,674,065 A | 6/1987 | Lange et al. ............ | 382/311 |
| 4,868,750 A | 9/1989 | Kucera et al. ........... | 711/2 |
| 5,020,019 A | 5/1991 | Ogawa ................... | 707/5 |
| 5,128,865 A | 7/1992 | Sadler .................... | 704/2 |
| 5,159,552 A | 10/1992 | van Gasteren et al. .... | 704/1 |
| 5,267,155 A | 11/1993 | Buchanan et al. ........ | 715/540 |
| 5,297,039 A | 3/1994 | Kanaegami et al. ...... | 707/5 |
| 5,317,546 A | 5/1994 | Balch et al. ............. | 368/9 |
| 5,337,233 A | 8/1994 | Hofert et al. ............ | 715/540 |
| 5,341,293 A | 8/1994 | Vertelney et al. ........ | 715/530 |
| 5,351,190 A | 9/1994 | Kondo .................... | 704/8 |
| 5,386,564 A | 1/1995 | Shearer et al. ........... | 395/650 |
| 5,392,386 A | 2/1995 | Chalas ................... | 715/841 |

(Continued)

FOREIGN PATENT DOCUMENTS

EP  0 364 180 A2  4/1990

(Continued)

OTHER PUBLICATIONS

Sriram, "ComponentXchange: An E-Exchange for software Components", Master Thesis, CiteSeer, pp. i-v, 1-77, 5-2001.*

(Continued)

*Primary Examiner*—Ted T. Vo
(74) *Attorney, Agent, or Firm*—Merchant & Gould

(57) ABSTRACT

A method and system are provided for downloading software components from a remote source to a software application for providing updates or additions to the application's functionality. All components and files that may be utilized to update or add to functionality available to the application are identified and are assembled on a manifest that may be located on a remote web server accessible by the application. If components of the application should be updated, or corrections or improvements to existing components are available, or new functionality is available that will transform the user's existing application and document into a "smart" application and "smart" document, the application may connect to the web server to download the required components.

41 Claims, 6 Drawing Sheets

U.S. PATENT DOCUMENTS

| | | | |
|---|---|---|---|
| 5,418,902 A | 5/1995 | West et al. | 715/503 |
| 5,446,891 A | 8/1995 | Kaplan et al. | 395/600 |
| 5,541,836 A | 7/1996 | Church et al. | 704/7 |
| 5,596,700 A | 1/1997 | Darnell et al. | 715/512 |
| 5,617,565 A | 4/1997 | Augenbraun et al. | 395/604 |
| 5,625,783 A | 4/1997 | Ezekiel et al. | 395/352 |
| 5,627,958 A * | 5/1997 | Potts et al. | 715/708 |
| 5,634,019 A | 5/1997 | Koppolu et al. | 715/744 |
| 5,640,560 A | 6/1997 | Smith | 395/615 |
| 5,657,259 A | 8/1997 | Davis et al. | 708/204 |
| 5,685,000 A | 11/1997 | Cox, Jr. | 704/9 |
| 5,708,825 A | 1/1998 | Sotomayor | 395/762 |
| 5,717,923 A | 2/1998 | Dedrick | 395/613 |
| 5,752,022 A | 5/1998 | Chiu et al. | 395/610 |
| 5,761,689 A | 6/1998 | Rayson et al. | 707/533 |
| 5,765,156 A | 6/1998 | Guzak et al. | 707/100 |
| 5,781,189 A | 7/1998 | Holleran et al. | 715/826 |
| 5,781,904 A | 7/1998 | Oren et al. | 707/100 |
| 5,794,257 A | 8/1998 | Liu et al. | 707/501 |
| 5,802,253 A | 9/1998 | Gross et al. | 395/51 |
| 5,802,262 A | 9/1998 | Van De Vanter | 395/180 |
| 5,802,299 A | 9/1998 | Logan et al. | 395/200.48 |
| 5,802,530 A | 9/1998 | van Hoff | 707/513 |
| 5,805,911 A | 9/1998 | Miller | 395/796 |
| 5,809,318 A | 9/1998 | Rivette et al. | 715/512 |
| 5,815,830 A | 9/1998 | Anthony | 707/6 |
| 5,818,447 A | 10/1998 | Wolf et al. | 715/512 |
| 5,821,931 A | 10/1998 | Berquist et al. | 715/784 |
| 5,822,539 A | 10/1998 | van Hoff | 395/200.66 |
| 5,826,025 A | 10/1998 | Gramlich | 395/200.47 |
| 5,832,100 A | 11/1998 | Lawton et al. | 382/100 |
| 5,845,077 A * | 12/1998 | Fawcett | 709/221 |
| 5,855,007 A | 12/1998 | Jovicic et al. | 705/14 |
| 5,859,636 A | 1/1999 | Pandit | 715/501.1 |
| 5,872,973 A | 2/1999 | Mitchell et al. | 395/685 |
| 5,875,443 A | 2/1999 | Nielsen | 707/2 |
| 5,877,757 A | 3/1999 | Baldwin et al. | 715/705 |
| 5,892,919 A | 4/1999 | Nielsen | 395/200.58 |
| 5,893,073 A | 4/1999 | Kasso et al. | 705/8 |
| 5,895,461 A | 4/1999 | De La Huerga et al. | 707/1 |
| 5,896,321 A | 4/1999 | Miller et al. | 365/189.01 |
| 5,900,004 A | 5/1999 | Gipson | 707/530 |
| 5,907,852 A | 5/1999 | Yamada | 715/541 |
| 5,913,214 A | 6/1999 | Madnick et al. | 707/10 |
| 5,920,859 A | 7/1999 | Li | 707/5 |
| 5,924,099 A | 7/1999 | Guzak et al. | 707/100 |
| 5,933,498 A * | 8/1999 | Schneck et al. | 705/54 |
| 5,944,787 A | 8/1999 | Zoken | 709/206 |
| 5,946,647 A | 8/1999 | Miller et al. | 704/9 |
| 5,948,061 A | 9/1999 | Merriman et al. | 709/219 |
| 5,956,681 A | 9/1999 | Yamakita | 704/260 |
| 5,974,413 A | 10/1999 | Beauregard et al. | 707/6 |
| 5,987,480 A | 11/1999 | Donohue et al. | 715/501.1 |
| 5,991,719 A | 11/1999 | Yazaki et al. | 704/251 |
| 5,995,756 A | 11/1999 | Herrmann | 395/712 |
| 6,006,265 A | 12/1999 | Rangan et al. | 709/226 |
| 6,006,279 A | 12/1999 | Hayes | 719/328 |
| 6,014,616 A | 1/2000 | Kim | 704/8 |
| 6,018,761 A | 1/2000 | Uomini | 706/206 |
| 6,028,605 A | 2/2000 | Conrad et al. | 345/840 |
| 6,052,531 A * | 4/2000 | Waldin et al. | 717/170 |
| 6,061,516 A | 5/2000 | Yoshikawa et al. | 717/109 |
| 6,067,087 A | 5/2000 | Krauss et al. | 715/762 |
| 6,085,201 A | 7/2000 | Tso | 715/505 |
| 6,088,711 A | 7/2000 | Fein et al. | 715/523 |
| 6,092,074 A | 7/2000 | Rodkin et al. | 707/102 |
| 6,108,674 A | 8/2000 | Murakami et al. | 715/515 |
| 6,112,209 A | 8/2000 | Gusack | 707/101 |
| 6,121,968 A | 9/2000 | Arcuri et al. | 345/352 |
| 6,122,647 A | 9/2000 | Horowitz et al. | 707/513 |
| 6,126,306 A | 10/2000 | Ando | 708/605 |
| 6,137,911 A | 10/2000 | Zhilyaev | 382/225 |
| 6,141,005 A | 10/2000 | Hetherington et al. | 715/866 |
| 6,151,643 A * | 11/2000 | Cheng et al. | 710/36 |
| 6,154,738 A | 11/2000 | Call | 707/4 |
| 6,167,568 A | 12/2000 | Gandel et al. | 717/176 |
| 6,173,316 B1 * | 1/2001 | De Boor et al. | 709/218 |
| 6,182,029 B1 | 1/2001 | Friedman | 704/9 |
| 6,185,550 B1 | 2/2001 | Snow et al. | 707/1 |
| 6,185,576 B1 | 2/2001 | McIntosh | 707/200 |
| 6,199,046 B1 | 3/2001 | Heinzle et al. | 705/1 |
| 6,199,081 B1 * | 3/2001 | Meyerzon et al. | 715/513 |
| 6,219,698 B1 * | 4/2001 | Iannucci et al. | 709/221 |
| 6,262,728 B1 | 7/2001 | Alexander | 345/440.1 |
| 6,272,074 B1 | 8/2001 | Winner | 368/10 |
| 6,272,505 B1 | 8/2001 | De La Huerga | 707/501 |
| 6,292,768 B1 | 9/2001 | Chan | 704/1 |
| 6,295,061 B1 | 9/2001 | Park et al. | 715/764 |
| 6,308,171 B1 | 10/2001 | De La Huerga | 707/3 |
| 6,311,177 B1 | 10/2001 | Dauerer et al. | 707/2 |
| 6,311,194 B1 | 10/2001 | Sheth et al. | 715/505 |
| 6,323,853 B1 | 11/2001 | Hedloy | 345/339 |
| 6,336,125 B2 | 1/2002 | Noda et al. | 715/531 |
| 6,336,131 B1 | 1/2002 | Wolf et al. | 709/203 |
| 6,338,059 B1 | 1/2002 | Fields et al. | 707/4 |
| 6,347,398 B1 | 2/2002 | Parthasarathy et al. | 717/11 |
| 6,349,295 B1 | 2/2002 | Tedesco et al. | 707/3 |
| 6,353,926 B1 * | 3/2002 | Parthesarathy et al. | 717/170 |
| 6,381,742 B2 | 4/2002 | Forbes et al. | 717/176 |
| 6,408,323 B1 | 6/2002 | Kobayashi et al. | 709/100 |
| 6,424,979 B1 * | 7/2002 | Livingston et al. | 715/511 |
| 6,434,567 B1 | 8/2002 | De La Huerga | 707/102 |
| 6,438,545 B1 | 8/2002 | Beauregard et al. | 707/6 |
| 6,477,510 B1 | 11/2002 | Johnson | 705/30 |
| 6,480,860 B1 | 11/2002 | Monday | 707/102 |
| 6,493,006 B1 | 12/2002 | Gourdol et al. | 345/825 |
| 6,516,321 B1 | 2/2003 | De La Huerga | 707/102 |
| 6,519,557 B1 | 2/2003 | Emens et al. | 704/8 |
| 6,519,603 B1 | 2/2003 | Bays et al. | 707/102 |
| 6,546,433 B1 | 4/2003 | Matheson | 709/318 |
| 6,553,385 B2 | 4/2003 | Johnson et al. | 707/104.1 |
| 6,556,984 B1 | 4/2003 | Zien | 707/2 |
| 6,564,264 B1 | 5/2003 | Creswell et al. | 709/245 |
| 6,571,241 B1 | 5/2003 | Nosohara | 707/6 |
| 6,618,733 B1 | 9/2003 | White et al. | 707/103 |
| 6,622,140 B1 | 9/2003 | Kantrowitz | 707/5 |
| 6,623,527 B1 | 9/2003 | Hamzy | 715/513 |
| 6,625,581 B1 | 9/2003 | Perkowski | 705/27 |
| 6,629,079 B1 | 9/2003 | Spiegel et al. | 705/26 |
| 6,631,519 B1 * | 10/2003 | Nicholson et al. | 717/169 |
| 6,636,880 B1 | 10/2003 | Bera | 708/206 |
| 6,658,623 B1 | 12/2003 | Schilit et al. | 715/513 |
| 6,687,485 B2 | 2/2004 | Hopkins et al. | 434/350 |
| 6,694,307 B2 | 2/2004 | Julien | 707/3 |
| 6,697,824 B1 | 2/2004 | Bowman-Amuah | 709/229 |
| 6,697,837 B1 | 2/2004 | Rodov | 709/203 |
| 6,708,189 B1 | 3/2004 | Fitzsimons et al. | 707/205 |
| 6,715,144 B2 * | 3/2004 | Daynes et al. | 717/174 |
| 6,717,593 B1 | 4/2004 | Jennings | 715/760 |
| 6,718,516 B1 | 4/2004 | Claussen et al. | 715/513 |
| 6,728,679 B1 | 4/2004 | Strubbe et al. | 704/270.1 |
| 6,732,090 B2 | 5/2004 | Shanahan et al. | 707/3 |
| 6,732,361 B1 | 5/2004 | Andreoli et al. | 719/313 |
| 6,745,208 B2 | 6/2004 | Berg et al. | 707/201 |
| 6,795,808 B1 | 9/2004 | Strubbe et al. | 704/275 |
| 6,802,061 B1 | 10/2004 | Parthasarathy et al. | 717/173 |
| 6,826,726 B2 | 11/2004 | Hsing et al. | 715/513 |
| 6,868,625 B2 | 3/2005 | Szabo | 715/738 |
| 6,874,143 B1 * | 3/2005 | Murray et al. | 717/173 |
| 6,880,129 B1 | 4/2005 | Lee et al. | 715/763 |
| 6,883,137 B1 | 4/2005 | Girardot et al. | 715/513 |
| 6,925,457 B2 | 8/2005 | Britton et al. | 707/1 |
| 6,925,470 B1 | 8/2005 | Sangudi et al. | 707/102 |
| 6,944,857 B1 | 9/2005 | Glaser et al. | 717/173 |

| | | | |
|---|---|---|---|
| 6,948,133 B2 | 9/2005 | Haley | 715/780 |
| 6,950,982 B1 | 9/2005 | Dourish | 715/512 |
| 6,957,385 B2 | 10/2005 | Chan et al. | 715/504 |
| 6,976,090 B2 | 12/2005 | Ben-Shaul et al. | 709/246 |
| 6,986,104 B2 | 1/2006 | Green et al. | 715/523 |
| 7,013,289 B2 | 3/2006 | Horn et al. | 705/26 |
| 7,051,076 B2 | 5/2006 | Tsuchiya | 709/206 |
| 7,082,392 B1 | 7/2006 | Butler et al. | 704/233 |
| 7,113,976 B2 | 9/2006 | Watanabe | 709/206 |
| 2001/0029605 A1* | 10/2001 | Forbes et al. | 717/11 |
| 2001/0041328 A1 | 11/2001 | Fisher | 434/157 |
| 2001/0042098 A1 | 11/2001 | Gupta et al. | 709/206 |
| 2001/0056461 A1 | 12/2001 | Kampe et al. | 709/201 |
| 2002/0002590 A1 | 1/2002 | King et al. | 709/206 |
| 2002/0003898 A1 | 1/2002 | Wu | 382/187 |
| 2002/0004803 A1 | 1/2002 | Serebrennikov | 715/513 |
| 2002/0007309 A1 | 1/2002 | Reynar | 705/14 |
| 2002/0023113 A1 | 2/2002 | Hsing et al. | 707/513 |
| 2002/0023136 A1 | 2/2002 | Silver et al. | 709/206 |
| 2002/0026450 A1 | 2/2002 | Kuramochi | 707/104.1 |
| 2002/0029304 A1 | 3/2002 | Reynar et al. | 709/332 |
| 2002/0035581 A1 | 3/2002 | Reynar et al. | 715/513 |
| 2002/0065110 A1 | 5/2002 | Enns et al. | 455/566 |
| 2002/0065891 A1 | 5/2002 | Malik | 709/206 |
| 2002/0066073 A1* | 5/2002 | Lienhard et al. | 717/105 |
| 2002/0078222 A1* | 6/2002 | Compas et al. | 709/232 |
| 2002/0091803 A1 | 7/2002 | Imamura et al. | 709/220 |
| 2002/0100036 A1* | 7/2002 | Moshir et al. | 717/173 |
| 2002/0103829 A1 | 8/2002 | Manning et al. | |
| 2002/0104080 A1* | 8/2002 | Woodard et al. | 717/176 |
| 2002/0110225 A1 | 8/2002 | Cullis | 379/67.1 |
| 2002/0120685 A1* | 8/2002 | Srivastava et al. | 709/203 |
| 2002/0129107 A1* | 9/2002 | Loughran et al. | 709/206 |
| 2002/0133523 A1 | 9/2002 | Ambler et al. | 707/536 |
| 2002/0149601 A1 | 10/2002 | Rajarajan et al. | 345/619 |
| 2002/0156792 A1 | 10/2002 | Gombocz et al. | 707/100 |
| 2002/0169802 A1 | 11/2002 | Brewer et al. | 707/513 |
| 2002/0178008 A1 | 11/2002 | Reynar | 704/272 |
| 2002/0178182 A1 | 11/2002 | Wang et al. | 715/501.1 |
| 2002/0184247 A1 | 12/2002 | Jokela et al. | 707/204 |
| 2002/0188941 A1* | 12/2002 | Cicciarelli et al. | 717/175 |
| 2002/0196281 A1 | 12/2002 | Audleman et al. | |
| 2002/0198909 A1 | 12/2002 | Huynh et al. | 707/513 |
| 2003/0002391 A1 | 1/2003 | Biggs | 368/82 |
| 2003/0005411 A1* | 1/2003 | Gerken | 717/120 |
| 2003/0009489 A1 | 1/2003 | Griffin | 707/500 |
| 2003/0014745 A1 | 1/2003 | Mah et al. | 717/170 |
| 2003/0025728 A1 | 2/2003 | Ebbo et al. | 345/744 |
| 2003/0051236 A1* | 3/2003 | Pace et al. | 717/177 |
| 2003/0056207 A1* | 3/2003 | Fischer et al. | 717/174 |
| 2003/0081791 A1 | 5/2003 | Erickson et al. | 380/282 |
| 2003/0083910 A1 | 5/2003 | Sayal et al. | 705/7 |
| 2003/0084138 A1 | 5/2003 | Tavis et al. | |
| 2003/0097318 A1 | 5/2003 | Yu et al. | 705/35 |
| 2003/0101204 A1 | 5/2003 | Watson | 708/206 |
| 2003/0101416 A1 | 5/2003 | McInnes et al. | 715/513 |
| 2003/0106040 A1 | 6/2003 | Rubin et al. | 717/106 |
| 2003/0115039 A1 | 6/2003 | Wang | 704/4 |
| 2003/0121033 A1* | 6/2003 | Peev et al. | 717/175 |
| 2003/0126136 A1 | 7/2003 | Omoigui | 707/10 |
| 2003/0140308 A1 | 7/2003 | Murthy et al. | 715/500 |
| 2003/0154144 A1 | 8/2003 | Pokorny et al. | 705/28 |
| 2003/0158841 A1 | 8/2003 | Britton et al. | 707/3 |
| 2003/0158851 A1 | 8/2003 | Britton et al. | 707/100 |
| 2003/0172343 A1 | 9/2003 | Leymaster et al. | 715/500 |
| 2003/0192040 A1* | 10/2003 | Vaughan | 717/173 |
| 2003/0195937 A1 | 10/2003 | Kircher et al. | 709/207 |
| 2003/0212527 A1 | 11/2003 | Moore et al. | 702/179 |
| 2003/0220795 A1 | 11/2003 | Araysantiparb et al. | 704/275 |
| 2003/0229593 A1 | 12/2003 | Raley et al. | 705/55 |
| 2003/0233330 A1 | 12/2003 | Raley et al. | 705/55 |
| 2004/0006741 A1 | 1/2004 | Radja et al. | 715/513 |
| 2004/0039990 A1 | 2/2004 | Baker et al. | 715/505 |
| 2004/0133846 A1 | 7/2004 | Khoshatefeh et al. | 715/500 |
| 2004/0165007 A1 | 8/2004 | Shafron | 345/781 |
| 2004/0199861 A1 | 10/2004 | Lucovsky | 715/500 |
| 2004/0201867 A1 | 10/2004 | Katano | 358/1.15 |
| 2004/0236717 A1 | 11/2004 | Demartini et al. | 707/1 |
| 2005/0050164 A1 | 3/2005 | Burd et al. | 709/217 |
| 2005/0055330 A1 | 3/2005 | Britton et al. | 707/1 |
| 2005/0094850 A1 | 5/2005 | Nakao | 382/103 |
| 2005/0120313 A1 | 6/2005 | Rudd et al. | 715/866 |
| 2005/0187926 A1 | 8/2005 | Britton et al. | 707/3 |

FOREIGN PATENT DOCUMENTS

| | | |
|---|---|---|
| EP | 0 481 784 A | 4/1992 |
| EP | 0598511 A | 5/1994 |
| EP | 0872827 A2 | 10/1998 |
| EP | 0810520 B1 | 12/1998 |
| EP | 1093058 A1 | 4/2001 |
| EP | 1280068 A2 | 1/2003 |
| EP | 1361523 A2 | 11/2003 |
| JP | 64-88771 | 4/1989 |
| JP | 2002163250 A | 6/2002 |
| WO | WO95/07510 A | 3/1995 |
| WO | WO99 17240 A | 4/1999 |
| WO | WO 00/54174 A1 | 9/2000 |
| WO | WO 00/67117 | 11/2000 |
| WO | WO 00/73949 A1 | 12/2000 |
| WO | WO 01/18687 A1 | 3/2001 |
| WO | WO 01/37170 A2 | 5/2001 |
| WO | WO 01/37170 A3 | 5/2001 |
| WO | WO 01/186390 A2 | 11/2001 |
| WO | WO 02/099627 A1 | 1/2002 |
| WO | WO 02/15518 A2 | 2/2002 |
| WO | WO 2004/012099 A2 | 2/2004 |

OTHER PUBLICATIONS

U.S. Appl. No. 10/184,190, filed Jun. 27, 2002, entitled "System and Method for Providing Namespace Related Information", Inventors: Jones et al.

U.S. Appl. No. 10/164,960, filed Jun. 6, 2002, entitled "System and Method for Providing Namespace Related Information", Inventors: Reynar et al.

U.S. Appl. No. 10/366,141, filed Feb. 13, 2003, entitled "Linking Elements of a Document to Corresponding Fields, Queries and/or Procedures in a Database", Inventors: Jones et al.

Fernandex M. et al., "SilkRoute: Trading Between Relations and XML", *Computer Networks*, Elsevier Science Publishers B.V., Amsterdam NL, vol. 33, No. 1-6, Jun. 2000, pp. 723-745.

Braganholo VDP; "Updating Relationship Databases Through XML Views", *Technical Report RP-328*, Online (http://www.inf.ufrgs.br/{vanessa/disc/iplinas/PropostaTese.pdf), Porto Alegre, RS, Brasil, Sep. 2002, XP-002279067, pp. 1-61.

Falquet G et al., "Design and Analysis of Active Hypertext Views on Databases,", *CUI-Technical Report*, Online (http://cui.unige.ch/isi/reports/design-anls-ahtv.pdf), Jan. 2002, XP-002279068, pp. 1-24.

Ceri S et al., "Deriving Production Rules for Incremental View Maintenance", *Proceedings of the International Conference on Very Large Data Bases*, 1994, XP-00914159, pp. 577-589.

Bonifati A., "Active Behaviors Within XML Document Management", *EDBT Ph.D. Workshop*, (EDBT Ph.D. WS 2000), Online (http://www.edbt2000.uni-konstanz.de/phd-workshop/papers/Bonifati.ps), Mar. 2000, Konstanz, Germany, XP-002279069, pp. 1-4.

U.S. Appl. No. 10/731,899, filed Dec. 9, 2003, entitled "Mechanism for Downloading Software Components from a Remote Source for Use by a Local Software Application", Inventors: Jones et al.

"Integrating with External Systems: iPlanet™ Unified Development Server", Sun Microsystems, Inc., Ver. 5.0, Aug. 2001, pp. 127-156.

Sperberg-McQueen, C.M. and Thompson, Henry, "XML Schema", W3C Architecture Domain, http://web.archive.org/web/20020802155904/http://www.w3.org/XML/Schema, 2000-2002, pp. 1-10.

Quin, Liam, "Extensible Markup Language (XML)", W3C Architecture Domain, http://web.archive.org/web/2002121962057/http://www.w3.org/XML/, 1996-2002, pp. 1-3.

Clark, James, and DeRose, Steve, "XML Path Language (XPath), Version 1.0", W3C, http://web.archive.org/web/2021010034434/http://www.w3.org/TR/xpath, 1999-2000, 99. 1-31.

"Microsoft BizTalk Server 2002—Using BizTalk Mapper", http://msdn.Microsoft.com/library/en-us/bts_2002/htm/lat_xmltools_map_intro_zkqb.asp . . . , Microsoft Corporation, 1999-2001, pp. 1-2.

"BizTalk Server 2002 Mapper User Interface", http://msdn.microsoft.com/library/en-us/bts_2002/htm/lat_xmltools_map_concept_codw . . . , Microsoft Corporation, 1999-2001, pp. 1.

"BizTalk Sever 2002 Compiling data", http://msdn.microsoft.com/library/en-us/bts_2002/htm/lat_xmltools_map_concept_drgl.a . . . , Microsoft Corporation, 1999-2001, pp. 1.

"BizTalk Server 2002 Testing Maps", http://msdn.microsoft.com/library/en-us/bts_2002/htm/lat_xmltools_map_concept_fhhy.a . . . , Microsoft Corporation, 1999-2001, pp. 1-2.

"BizTalk Server 2002 View Links and Functoids By Using Grid Preview", http://msdn.microsoft.com/library/en-us/bts_2002/htm/lat_xmltools_map_check_fuwn.as . . . , Microsoft Corporation, 1999-2001, pp. 1.

"The StarOffice™ 6.0 Suite: New Features Guide", Sun Microsystems, V. 1.1, Jul. 2002, pp. 1-31.

"New Microsoft Office Family Application Taps Power of Industry-Standard XML", http://www.microsoft.com/presspass/press/2002/oct02/10-09officefamilypr.mspx, Microsoft Corporation, Oct. 2002-Feb. 2003, pp. 1-2.

"Q&A: How 'XDocs' Alters the Paradigm for Gathering Business-Critical Information", http://www.microsoft.com/presspass/press/2002/oct02/10-09officefamily.mspx, Microsoft Corporation, Oct. 2002-Feb. 2003, pp. 1-4.

"InfoPath: Microsoft Names New Product from Office Group", http://www.microsoft.com/presspass/press/2003/feb03/02-10infopath.mspx, Microsoft Corporation, Oct. 2002-Feb. 2003, pp. 1-4.

"Microsoft Unveils Visual Studio.NET Enterprise Tools", Microsoft Corporation, http://microsoft.com/presspass/press/2001/may01/05-21vseepr.mspx, May 2001, pp. 1-4.

"Microsoft Extends XML Web Services Support in .NET Enterprise Servers Through Visual Studio .NET", http://www.microsoft.com/presspass/press/2002/feb02/02-13servervspr.mspx, Microsoft Corporation, Feb. 2002, pp. 1-3.

"Integrated Development Environment (IDE)", http://web.archive.org/web/20020602032242/http://altova.com/products_ide.html, Jun. 2002, pp. 1-2.

"How to Use XSL to Transform Excel XML Spreadsheet for Server-Side Use", http://support.microsoft.com/default.aspx?scid=kb;en-us;278976, Microsoft Corporation, Aug. 2004, pp. 1-7.

"Altova markup your mind!", http://web.archive.org/web/20021204211721/http://altova.com/products_ide.html, Dec. 2002, pp. 1-3.

"Arbortext and Accessibility", http://web.archive.org/web/20021219133536/www.arbortext.com/html/accessibility.html, Dec. 2002, pp. 1-5.

"XML Compliance, 100% Pure XML", http:web.archive.org/web/20021209185855/www.arbortext.com/html/xml_compliance, Dec. 2002, pp. 1-3.

"Schemas", http://web.archive.org/web/20021221023148/www.arbortext.com/html/schemas.html, Dec. 2002, pp. 1-3.

"Arbortext's Support for XSL-FO", http://web.archive.org/web/20021221021632/www.arbortext.com/html/xsl-fo.html. Dec. 2002, pp. 1-4.

"Corel XMetal[4], Making XML Content Creation Easy", http://web.archive.org/web/20031118215158/www.corel.com/servlet/Satellite?pagename, Nov. 2003, pp. 1-2.

"Corel XMetal 4 and Interwoven TeamXML", http://web.archive.org/web/20030807211225/www.corel.com/futuretense_cs/ccurl/corel+xml+4+and+interwoven+teamxml.pdf, Aug. 2003, pp. 1-2.

"The Corel-XyEnterprise XML Solution", http://web.archive.org/web/20030807154355/www.corel.com/futuretense_cs/ccurl/corel+and+XY+enterprise+XML+solution.pdf, Aug. 2003, pp. 1-2.

Homer, Alex; Enfield, Andrew; Gross, Christian; Jakab, Stephen; Hartwell, Bruce; Gill, Darren; Francis, Brian; Harrison, Richard, "Professional Active Server Pages", WROX Press Ltd., 1997, Chapter 6, Part 2, Section "Client-Side Scripting and Components", Subsection "Choosing Your Applets and Controls", pp. 1-32.

Flanagan, David; "JavaScript—The Definitive Guide, Fourth Edition", Jan. 2002.

Brockschmidt, Kraig; "Inside OLE, Second Edition", 1995 Microsoft Press, p. 169.

Toth, Viktor, "Visual C++4 Unleashed", 1996, Sams Publishing, p. 174.

Bosak: "XML: The Universal Publishing Format," SGML/XML Europe 1998, (XP00228575) May, 1998, pp. A1-C17.

Kristensen, "Template Resolution In XML/HTML," Computer Networks and ISDN Systems, vol. 30, 1998, (XP004121423) pp. 239-249.

Fan, et al., FormPlus: A Form Authoring Toolkit,"Proceedings of the Fourteenth Annual Computer Software and Applications Conference," Oct. 31-Nov. 2, 1990, pp. 255-260 (XP000223616).

Boone, "Concept Features In Re: Agent, An Intelligent Email Agent," Proceedings of the 2nd International Conference on Autonomous Agents, May 9-13, 1998, (XP000887407), pp. 141-148.

Takkinen, et al., "CAFE: A Conceptual Model for Managing Information In Electronic Mail," Proceedings of the Annual Hawaii Interational Conference on System Sciences, 1998 (XP000775829), pp. 44-53.

Santos, C.A.S., L.F.G Soares, G.L. de Souza and J.P. Courtiat; *Design methodology and formal validation of hypermedia documents*; Proceedings of the sixth ACM international conference on multimedia, (1998) p. 39-48.

Terveen, Loren, Will Hill and Brian Amento; *Constructing, organizing, and visualizing collections of tropically related Web resources*; ACM Trans. Comput.-um. Interact. 6, 1 (Mar. 1999) p. 67-94.

Barrett, Rob, Paul P. Maglio and Daniel C. Kellem; *How to personalize the Web*; Conference proceedings on human factors in computing systems (1997) p. 75-82.

Marx, Matthew and Chris Schmandt; *CLUES: dynamic personalized message filtering*; Proceedings of the ACM 1996 conference on computer supported cooperative work (1996) p. 113-121.

Goschka, Karl M. and Jurgen Falb; *Dynamic hyperlink generation for navigation in relational databases*; Proceedings of the tenth ACM conference on hypertext and hypermedia: returning to our diverse roots (1999) p.23-24.

Pentland, Alex; *Perceptual user interfaces: perceptual intelligence*; Commun. ACM 43, 3 (Mar. 2000) p. 35-44.

Stairmand, Mark A.; *Textual context analysis for information retrieval*; Proceedings of the 20th annual international ACM SIGIR conference on research and development in information retrieval (1997) p. 140-147.

Glushko, Robert J., Jay M. Tenebaum and Bart Meltzer; *An XML framework for agent-based E-commerce*; Commun. ACM 42, 3 (Mar. 1999) p. 106.

Kukich, Karen; *Technique for Automatically Correcting Words in Text*; ACM Comput. Surv., 24, 4 (Dec. 1992); pp. 377-439.

Marx, Matt and Chris Schmandt; *Putting People First: Specifying Proper Names in Speech Interfaces*; Proceedings of the ACM Symposium on User Interface Software and Technology; 1994; pp. 29-37.

Ford, Bryan, Mike Hibler, Jay Lepreau, Roland McGrath and Patrick Tullman; *Interface and execution models in the fluke kernel*, Proceedings of the third symposium on operating systems design and implementation, (1999) p. 101-115.

Desmarais, Michel C. and Jiming Liu; *Exploring the applications user-expertise assessment for intelligent interfaces*; Proceedings of the conference on human factors in computing systems, (1993) p. 308-313.

Foley, James D.; *Future directions in user-computer interface software*; Conference proceedings on organizational computer systems, (1991) p. 289-297.

Hartson, H. Rex and Deborah Hix; *Human-computer interface development: concepts and systems for its management*; ACM Comput. Surv. I (Mar. 1989) p. 5-92.

Foley, Jim; *Integrating computer technology, people technolgy; strategies and case studies from Georgia Tech's Graphics, Visualization and Usability Center*; Proceedings of the workshop on advanced visual interfaces, (1994) p. 34-43.

Tsai, M., P. Reiher and G.J. Popek; *Command management system for next-generation user input*; Proceedings of the seventh workshop on hottopics in operating systems, (1999) p. 179-84.

*Microsoft Computer Dictionary*, Microsoft, Microsoft Press, Fifth Edition, p. 409.

Kuenning, Geoff, "Using ISPELL from Emacs", http://theochem.ki.ku.dk/on_line_docs/ispell/ispell_1.html, 4 pp., publication date unknown.

"Spellout Command", Commands Reference, vol. 5, http://www.rz.uni-hohenheim.de/betriebssysteme/unix/aix/aix_4.3.3_doc/base_doc/usr/ share/man/inf . . . , 1 page, publication date unknown.

"Chapter 8—Standard Input and Output", http://www.comp.lancs.ac.uk/computing/users/eiamjw/unix/chap8.html, 3 pp.

Panagiotis, Christias, Man-cgi 1.15, http://www.physics.umn.edu/cgi-bin/man-cgi?spell, 1994, 5 pp.

Bischof, Hans-Peter, "Spell, Spellin, Spellout—Finding Spelling Errors", http://www.vorlesungen.uni-osnabrueck.de/informatik/shellscript/Html/Man/_Man_NeXT_html/html . . . , Apr. 21, 1997, 2 pp.

"Module 123—Spell", http://duplex.hypermart.net/books/bsd/501-504.html, 4 pp., publication date unknown.

Panagiotis, Christias, Man-cgi 1.15, http://www.calpoly.edu/cgi-bin/man-cgi?spell+1, 1994, 3 pp.

Martensson, Bengt, "Thread-Enhanced Spell Front End for GNU Emacs+ Detex+ Delatex", http://www.geocrawler.com/archives/3/337/1987/8/0/1871981/, Aug. 20, 1987, 1 page.

Willisson, Pace, Ispell (1), http://www.rt.com/man/findaffix.1.html, 1983, 15 pp.

Willisson, Pace, Ispell (1), "User Commands", http://www.csee.usf.edu/cgi-bin/man-cgi?ispell, 1983, 18 pp.

"Handout 38: Spell Checking, Word Counting, and Textual Analysis", http://courses.cs.emporia.edu/pheattch/courses/2002/cs501s02/hand38/, 3 pp., publication date unknown.

Keunning, Geoff, "International Spell", http://fmg-www.cs.ucla.edu/geoff.ispell.html, 3 pp., publication date unknown.

Ispell 4, "Ispell—Format of Ispell Dictionaries and Affix Files", http://www.bigbiz.com/cgi-bin/manpage?4+ispell, 11 pp., publication date unknown.

McMahon, Lee. E., "SED—A Non-Interactive Text Editor," Bell Laboratories, Murray Hill, New Jersey 07974, Aug. 15, 1978, pp. 16.

Beitner, N.D.; Hall, W.; Goble, C.A., "Multimedia Support and Authoring in Microcosm: An Extented Model," Dept. of Electronics and Computer Science, Univ. of Southampton, Southampton SO17 1BJ, UK; Dept. of Computer Science, Univ. of Manchester, Oxford Road, Manchester M13 9PL, UK, pp. 1-12, publication date unknown.

IBM Corporation, IBM Research Disclosure #368; "Multimedia Hyperlinks Automatically Created For Reference Doucments," *IBM Technical Disclosure* Bulletin, Jun. 1993, pp. 1-5.

*The Complete LINUX™ Operating System 5.2 Deluxe*, Red Hat,® Macmillian Digital Publishing USA, A Viacom Company, Red Hat Software, Inc., ISBN 1-57595-199-1B, 1995-1998, pp. 1-385.

*User Manual For AddressMate and AddressMate Plus*, CoStar Corporation, AddressMate Software, 1994-1995, pp. 1-210.

*Getting Results With Microsoft® Office 97, Real World Solutions For The Work You Do*, Microsoft Corporation, 1995-1997, pp. 1-703.

*InfoCentral™ 7*, User's Manual, Corel Corporation, vol. 1, Version 7.0, 1996, pp. 1-86.

Corel® Office Professional 7 Quick Results User's Manual, vol. 1, Version 7.0 (first printing), Corel Corporation, Limited, pp. 1-531, publication date unknown.

Novell GroupWise User's Guide for Windows 16-Bit Version 5.2, Novell, Inc., 1993-1997, pp. 1-231.

Novell GroupWise User's Guide for Windows 32-Bit Version 5.2, Novell, Inc., 1998, pp. 1-318.

Claris Em@iler Getting Started User's Guide, For Macintosh, Claris Corporation, 1995-1997, 61 pp.

Developer's Guide To Apple Data Detectors, For Version 1.0.2., Apple Computer, Inc., 1997, pp. 1-33.

Apple Data Detectors User's Manual, Apple Computer, Inc., 1997, pp. 1-15.

Nardi, Bonnie A.; Miller, James R.; Wright, David J., "Collaborative, Programmable Intelligent Agents," Jim Miller/Miramontes Computing, Apple Computer Advanced Technology Group, http://www.miramontes.com/writing/add-cacm/add-cacm/html, Mar. 1998, pp. 1-11.

Hewkin, "Smart Tags-the Distributed-Memory Resolution", IEE Review, Jun. 22, 1989, pp. 203-206.

Measuring Units Conversion Table—http://web.archic.org- 1997 Internet French Property, pp.1-4.

IBM Technical Disclosure Bulletin, "National Language Support Enhancement for Culture-Specific Operations", Nov. 1, 1993, vol. 36, Issue 11, pp. 629-638.

Towers, J. Tarin, Visual Quickstart Guide: Dreamweaver 2 for Windows and Macintosh, 1999, Peachpit Press, pp. 150-151.

Driza, Scott, "Learn Word 2000 VBA Document Automation", Wordware Publishing Inc., 2001, 6 pp.

Cornell, Paul, "Developing Smart Tag DLLs", MSDN Library, http://msdn.microsoft.com/library/default.asp?url=/library/en-us/dnsmarttag/html/odc_smarttags.asp, Apr. 2001, pp. 8.

Menu Customizing, IBM Technical Disclosure Bulletin, vol. 34, No. 1, Jun. 1991, pp. 91-92 (4 pp. total).

Perry, Brad, et al., "Discovering Similar Resources by Content Park-Linking", Proceedings of the Sixth International Conference on Information and Knowledge Management, published by ACM Press 1997, pp. 317-324.

Schulz, Charles, "Writing Applications for Uniform Opertion on a Mainframe or PC: A Metric Conversion Program", Lockheed Missles & Space Company, Inc., Sunnyvale, CA, May 1990, pp. 348-361.

Devanbue, P. et al., "Chime: customizable hyperlink insertion and maintenance engine for software engineering enviroments", Software Engineering, Publication date: 1999, ISBN: 1-58113-07400.

"Using Flyswat", http://www.flywsat.com/using.html, download date: Sep. 28, 1999, 1 pp.

"What is Flyswat", http://www.flyswat.com, download date: Sep. 28, 1999, 5 pp.

"Intelligent Text Processing: About", http://www.syntalex.co.uk/about/about.html, download date: Aug. 7, 1999, 1 pp.

"Intelligent Text Processing: Automatic Cross-Referencing", http://www.syntalex.co.uk/services/acrl.html, download date Aug. 7, 1999, 3 pp.

"Intelligent Text Processing: Case Study: Context", http://www.syntalex.co.uk/casestudies/context.html, download date: Aug. 7, 1999, 3 pp.

Mueller, Jennifer M., "Work Smarter with Smart Tags", Journal of Accounting—Online, vol. 194, No. 5, Nov. 2002, http://www.aicpa.org/pubs/jofa/nov2002/Mueller.htm<, retrieved on Apr. 22, 2005.

Brooks-Bilson, "Programming ColdFusion" [electronic resource] 2001, Safari Tech Books Online, 1st Edition, 25 pp.

Wilker, John, "ColdFusion MX Adds J2EE, XML, and Web Services Compatibility", Aug. 9, 2002, http://builder.com.com/5102-6387-104585.html, 3 pp.

"Smart Tags: Dumb Technology?", webreference.com, Online, Aug. 29, 2001, http://www.webreference.com/xml/column30/3.html, 3 pp.

"Being 'Smart' with Smart Tags in Office XP", Create for Mississippi, Aug. 2001, http://www.create.cett.msstate.edu/create/howto/smart_tags.pdf, 7 pp.

Harold, E.R., "XML: Extensible Markup Language", IDG Books Worldwide, Books 24×7.com printout, 1998, pp. 1-11.

Marais, Hannes, "Supporting Cooperative and Personal Surfing With a Desktop Assistant", 1997, ACM Press, pp. 129-138.

U.S. Appl. No. 09/818,157, filed Mar. 27, 2001, entitled "Automatically Adding Proper Names to a Database".

U.S. Appl. No. 09/841,265, filed Apr. 24, 2001, entitled "Method and System for Applying Input Mode Bias".

U.S. Appl. No. 09/841,266, filed Apr. 24, 2001, entitled "Method and System for Providing Electronic Commerce Actions Based on Semantically Labeled Strings".

U.S. Appl. No. 09/906,552, filed Jul. 16, 2001, entitled "Method and System for Providing Restricted Actions for Recognized Semantic Categories".

U.S. Appl. No. 09/906,467, filed Jul. 16, 2001, entitled "Application Program Interfaces for Semantically Labeling Strings and Providing Actions Based on Semantically Labeled Strings".

U.S. Appl. No. 09/907,418, filed Jul. 17, 2001, entitled "Method and System for Defining Semantic Categories and Actions".

U.S. Appl. No. 09/588,411, filed Jun. 6, 2000, entitled "Method and System for Semantically Labeling Stings and Providing Actions Based on Semantically Labeled Strings".

U.S. Appl. No. 10/141,712, filed May 9, 2002, entitled "Method, System, and Apparatus for Converting Dates Between Calendars and Languages Based Upon Semantically Labeled Strings".

U.S. Appl. No. 10/154,630, filed May 23, 2002, entitled "Method, System, and Apparatus for Converting Numbers Based Upon Semantically Labeled Strings".

U.S. Appl. No. 10/140,544, filed May 7, 2002, entitled "Method, System, and Apparatus for Converting Numbers Between Measurement Systems Based Upon Semantically Labeled Strings".

U.S. Appl. No. 10/155,680, filed May 23, 2002, entitled "Method, System, and Apparatus for Converting Currency Values Based Upon Semantically Labeled Strings".

U.S. Appl. No. 10/179,810, filed Jun. 25, 2002, entitled "Method, System, and Apparatus for Performing Custom Actions on Digital Content".

U.S. Appl. No. 10/178,680, filed Jun. 24, 2002, entitled "System and Method for Incorporating Smart Tags in Online Content".

U.S. Appl. No. 10/179,438, filed Jun. 25, 2002, entitled "Method and System for Dynamically Providing Actions Associated with Semantically Labeled Strings".

U.S. Appl. No. 10/184,298, filed Jun. 27, 2002, entitled "Method and System for Associating Actions with Semantic Labels in Electronic Documents".

U.S. Appl. No. 10/377,258, filed Feb. 28, 2003, entitled "Method and System for Enhancing Paste Functionality of a Computer Software Application".

U.S. Appl. No. 10/426,446, filed Apr. 29, 2003, entitled "Methods and System for Recognizing Names in a Computer-Generated Document and for Providing Helpful Actions Associated with Recognized Names".

U.S. Appl. No. 10/608,267, filed Jun. 27, 2003, entitled "Leveraging Markup Language Data for Semantically Labeling Text Strings and Data for Providing Actions Based on Semantically Labeled Text Strings and Data".

U.S. Appl. No. 10/780,376, filed Feb. 17, 2004, entitled "Methods and Systems for Providing Automatic Actions on Recognized Text Strings in a Computer-Generated Document".

U.S. Appl. No. 10/183,317, filed Jun. 25, 2002, entitled "System and Method for Issuing a Message to a Program".

U.S. Appl. No. 11/396,937, filed Apr. 3, 2006, entitled "Automatically Adding Proper Names to a Database".

European Communication dated Apr. 19, 2006 cited in EP Application No. 05 000 506.5 - 1527 (60001.0266EP01).

European Communication dated Sep. 25, 2006 in EP 03 01 4181.

World Wide Web Consortium, "Document Object Model (DOM) Level 2 Events Specification, Version 1.0", http://www.w3.org/TR/2000/REC-DOM-Level-2-Events-20001113/DOM2-Events.pdf, Nov. 2000, 50 pp.

World Wide Web Consortium, "Document Object Model (DOM) Level 2 Core Specification, Version 1.0", http://www.w3.org/TR/2000/REC-DOM-Level-2-Core-20001113/DOM2-Core.pdf, Nov. 2000, 107 pp.

European Communication dated Nov. 9, 2006 in EP 03010292.5.

"Word 2002 Add in: measurement Converter Smart Tag", http://www.microsoft.com/downloads/details.aspx?FamilyID=f67fc42c-5f41-4c3f-9d5a-71354471dc32&DisplayLang=en, retrieved on Nov. 9, 2006, 2 pgs.

"Microsoft Measurement Converter Smart Tag - Chinese Version", http://www.jiyang.gov/cn/laiying/My%20Pictures/%E8%B4%E5%BA%86%E8%BE%89/office2003/Files/PFILES/COMMON/MSSHARED/SMARTTAG/CMEASURE/1033/CHMCABT.HTM, retrieved on Nov. 7, 2006, 2 pgs.

European Communication dated Nov. 17, 2006 in EP 03 011 851.7 - 2211.

European Communication dated Dec. 11, 2006 in EP 03 012 830.0-2211.

Singapore Search Report/Written Opinion dated Jan. 26, 2007 in SG 200500214-2.

European Communication dated Feb. 16, 2007 cited in European Application No. 04 003 683.2-2211.

Anonymous, "Adding Data from Other Sources in PowerPoint 2002," Jul. 2002, Internet article, XP-002420700, A Professional Approach Series the E-Zine Approach, http://www.glencoe.com/ps/computered/pas/article.php4?articled-437, 8 pgs.

Rice, F.C., "Transform XML Files with XSLT When Importing into Microsoft Excel 2002," Jul. 2001, Internet article, XP-002420701, http://msdn2.microsoft.com/en-us/library/aa140055(office.10,d=printer).aspx, 9 pgs.

Johnson, L., "What's So Special About Paste Special?", Jun. 2002, Internet article, XP-002420702, http://pubs.logicalexpressions.com/Pub0009/LPMArticle.asp?ID=40, 5 pgs.

Anonymous, "Moving and Copying Text Tutorial," Aug. 17, 2001, Internet Article, XP-002307566, http://tutorials.findtutorials.com/read/category/102/id/342/p/3, 4 pgs.

Blaheta et al., "Assigning Function Tags to Parsed Text," Morgan Kaufmann Publishers Inc., 2000, pp. 234-240.

* cited by examiner

Fig. 3

MECHANISM FOR DOWNLOADING SOFTWARE COMPONENTS FROM A REMOTE SOURCE FOR USE BY A LOCAL SOFTWARE APPLICATION

TECHNICAL FIELD

This invention relates to a mechanism for downloading software components from a remote source for use by a software application.

BACKGROUND OF THE INVENTION

Computer software applications allow users to create a variety of documents to assist them in work, education, and leisure. For example, popular word processing applications allow users to create letters, articles, books, memoranda, and the like. Spreadsheet applications allow users to store, manipulate, print, and display a variety of alpha-numeric data. Such applications have a number of well-known strengths, including rich editing, formatting, printing, calculation, and offline editing.

Most modern computer software applications do not contain all necessary programming for providing the functionality of the software application at application boot-up time. Most computer software applications are associated with a number of separate components or individual modular routines that have been compiled and that have been dynamically linked to the software application, and are ready to use with the software application or with other components of the software application upon being "called" by the software application. Such components take a variety of forms, including components known as dynamic-link libraries (dll), which are executable files or routines stored separately from the software application and which are loaded by the software application only when they are needed.

Various software development models have been developed for using individual modular software routines, such as the so-called component object model or COM, which allows for the building of the software application from individual modular routines that may be plugged in, or unplugged, to a larger software application when needed.

Such systems allow for individual modular software routines to be held in storage until they are needed so that they do not unnecessarily consume memory and processing time. Other advantages of such software systems include the ability of software developers to make changes or corrections to individual components without affecting the overall programs to which they are associated. Moreover, using a component object modeling system for building software applications allows software developers to use individual software components in multiple software applications.

An example of an individual component includes a component responsible for drawing a graphical user interface, such as a toolbar, that may be used for drawing the same toolbar on a number of software applications. Other examples include Extensible Markup Language (XML) programs, Extensible Markup Language transformation programs, or any sub-routine that may be downloaded to, and associated with, a software application for which it may provide some type of support or functionality.

A typical implementation of a software application using a variety of modular software routines or components requires that a software application, along with all required components, be shipped to the end user for downloading on to the end user's local computer. If the software application developer later finds an error in the programming of an individual component, typically the user must receive a repair or "patch" from the software developer that must be installed on the end user's computer to repair the error in the programming of the component. Unfortunately, the repair or "patch" must be sent to every user who has purchased, downloaded, and/or installed the software application using the defective component.

Another exemplary implementation of software applications using modular software routines include documents that are enabled to use the functionality of those modular routines to add special or "smart" functionality to the documents. For example, a user may need an additional software component or set of components to add help content or additional document actions to the existing functionality of the application being used to create and edit the document. Unfortunately, adding additional components or sets of components requires the user to receive an installation package and install the new components in order to add the new or enhanced functionality.

It is with respect to these and other considerations that the present invention has been made.

SUMMARY OF THE INVENTION

The present invention provides a method and system for downloading software components from a remote source to a software application for providing updates or additions to the application's functionality. Generally described, a schema is attached to a document defining permissible data content, data type and data structure from the document. The document is structured to associate the document with the schema. A solution is associated with the document structure. For example, a solution associated with a document structure may include help tools associated with an expense report document structure, or the expense report structure may include a cost section (structure) associated with a currency conversion solution. A plurality of software components comprising the solution is assembled at a location remote from the document. The document is enabled to call the solution to obtain functionality provided by the plurality of software components. If it is determined that the plurality of software components are required by the application to provide functionality to the document, the plurality of software components are downloaded to the application. Before downloading the software components to the application the software application is connected to the remote server. The connection may be via a distributed computing environment such as the Internet, an Intranet, or via a local area network or wireline or wireless telecommunications network.

A solution property is attached to the document for pointing the document to the solution, and a solution location is attached to the document for enabling the document to locate the solution at the remote location. The solution and the plurality of software components comprising the solution are listed in a manifest of software components. The manifest is stored in a remote library of software components on a remote server accessible by the document.

Prior to downloading the software components to the application, a determination is made as to whether the plurality of software components for providing the solution is present in a local library of software components. If the plurality of software components is not present in the local library of software components, the manifest at the remote library of software components is called for obtaining the solution. Prior to downloading the software components to the application, a query may be presented to the user to determine whether the plurality of software components should be downloaded. The query may include a notification that the software components have been updated at the remote server, or that additional software components have been added to the plurality of software components. Additionally, the user may receive notification that a set amount of time has elapsed since the last download of software components to the application.

Prior to downloading the software components to the document, the security of the manifest is checked. The security of the manifest is checked by determining whether the manifest is located at a trusted site or by determining whether the manifest is located from a trusted intranet site. Additionally, security of the manifest may be determined by checking digital signatures applied to files contained on the manifest by the creator or administrator of those files against a list of trusted digital signatures. In either case, if the security of the manifest cannot be assured, downloading the plurality of software components to the application is prevented. Alternatively, after downloading the plurality of software components to the application, but prior to installing those components for use by the application and document, a checksum value may be obtained representing the contents of the manifest at the remote server site, and that checksum value may be compared against a second checksum value representing the contents of the manifest after the contents have been downloaded. If the second checksum value differs from the first checksum value, installing the software components for use by the application is prevented.

After checking the security of the manifest, the contents of the manifest are compared to software components present in a local library to determine whether updates or additions to the contents of the manifest have been made. If updates or additions to the contents of the manifest have been made, downloading of the contents from the remote server for use by the application may proceed. After the software components are downloaded to the application, those components are installed for providing to the application and document the functionality associated with the downloaded software components.

According to another aspect of the invention, an Extensible Markup Language (XML) schema is attached to the document to define permissible data content, data types and data structures for the document. Particular portions of the document are annotated with XML structure associated with the schema. A solution comprising a plurality of software components is associated with XML elements making up the XML structure. The document is enabled to call the solution to obtain functionality provided by the plurality of software components upon initiation of editing the document within an XML element associated with a particular solution.

Once a document is open and a computer cursor is placed within a particular portion of the document, a list of XML elements is generated enclosing the position of the cursor. A determination is made as to whether a solution property pointing the document to the solution is associated with the list of XML elements. A determination is made as to whether the plurality of software components for providing the solution is present in a local library of software components, and if the plurality of software components is not present in the local library of software components, the manifest at the remote library is called for obtaining the solution.

These and other features, advantages, and aspects of the present invention may be more clearly understood and appreciated from a review of the following detailed descriptions of the disclosed embodiments and by reference to the appended drawings and claims.

BRIEF DESCRIPTION OF THE DRAWINGS

FIG. 3 is a computer screen display of a software application graphical user interface through which is displayed a document and associated contextually sensitive actions and help content according to an embodiment of the present invention.

DETAILED DESCRIPTION

Figure 1:
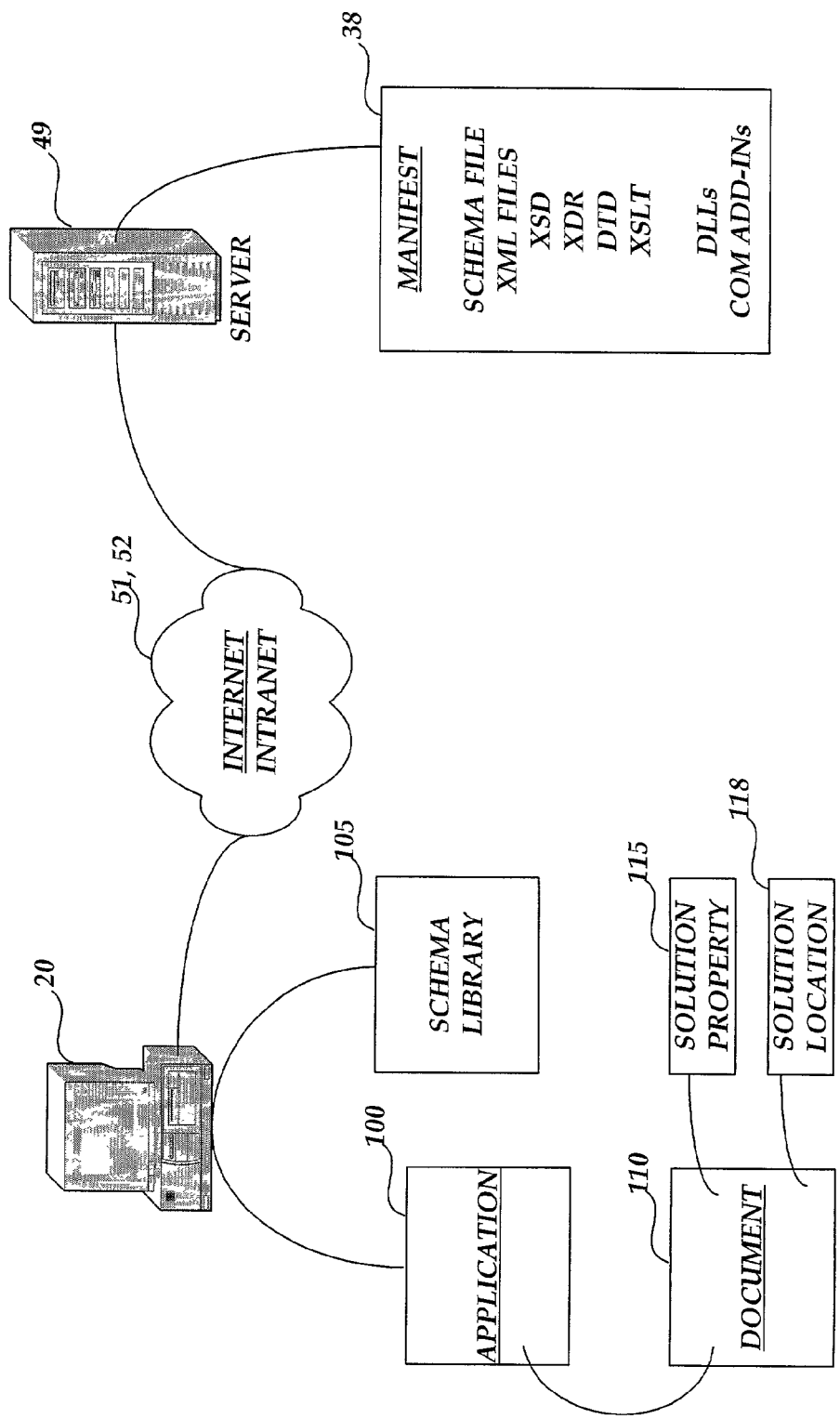
FIG. 1 is a simplified block diagram illustrating a client-server architecture for use in conjunction with an embodiment of the present invention.

Referring now to the drawings in which like numerals refer to like parts or components through the several figures. FIG. 1 is a simplified block diagram illustrating a client-server architecture for use in conjunction with an embodiment of the present invention. All components and files necessary to operate or fully implement the functionality or solutions available to a software application 100 are identified and are assembled on a local library of software components in the schema library 105. For a detailed description of the schema library 105, see U.S. Patent Application Publication No. 2005/0125720 entitled "Programmable Object Model for Namespace or Schema Library Support in a Software Application," which is incorporated herein by this reference as if fully set out herein.

All components and files that may be utilized to update or add to functionality available to the application 100 are identified and are assembled on a manifest 38 which may be located in a remote library of software components on a remote web server 49 accessible by the user via the user's computer 20. If the user is informed that the components on her client-side computer 20 should be updated, or that corrections or improvements to existing components are available, or that new functionality is available that will transform the user's existing application 100 and document 110 into a "smart" application and "smart" document, the user may connect to the web server 49 via the Internet 51, or via an intranet 52, to download the required components. Alternatively, the user may connect to the web server 49 via any suitable distributed computing environment, including wireline and wireless telecommunications networks, for allowing the user to connect to the web server 49 to download files from the manifest 38.

The manifest 38 may include all components, including dlls, component add-ins, Extensible Markup Language (XML), schema files and all associated XML files required by a software application for operating properly or required for improving, or adding, functionality to the software application 100. According to an embodiment of the present invention, the manifest 38 may also include information helpful to the end user, or to the end user's computer, for installing the downloaded components. For example, the manifest 38 may include information specifying the type for a given dynamic-link library (dll) so that the client-side computer 20 can properly register the dll including any need for specific registry keys for properly registering the dll.

A schema may be attached to the manifest 38 to define permissible data content, data type and data structure of the manifest as a file and for associating the manifest with files, documents and applications that may call the manifest 38 for obtaining a download of required components. For purposes of example only and not for limitation of the invention described herein, the following is an example XML-based schema that may be attached to the manifest 38 for associating the manifest with files, documents and applications that may call the manifest 38 for obtaining a download of required components.

Sample Manifest Schema

```
<xsd:schema         xmlns:xsd="http://www.w3.org/2001/
                      XMLSchema"
xmlns="urn:schemas-microsoft-com:smartdocuments:manifest"
    targetNamespace="urn:schemas-microsoft-
com:smartdocuments:manifest" elementFormDefault="qualified">
    <xsd:annotation>
        <xsd:documentation xml:lang="en">
            The schema for office smart document, transform and schema
            manifests.
        </xsd:documentation>
    </xsd:annotation>
    <xsd:element name="manifest" type="manifestType" />
    <xsd:complexType name="manifestType" mixed="true">
        <xsd:sequence>
            <xsd:element name="version" type="xsd:string" />
            <xsd:element name="location" type="xsd:string" />
            <xsd:element               name="update-
                                              Frequency"
type="zeroAndPositiveInteger" minOccurs="0" maxOccurs="1"/>
            <xsd:element name="uri" type="xsd:string" />
            <xsd:element      name="manifestURL"     type=
                                                    "xsd:
                                                    string"
minOccurs="0" maxOccurs="1" />
            <xsd:element      name="solution"        type=
                                                    "solution-
                                                    Defn"
minOccurs="1" maxOccurs="unbounded" />
        </xsd:sequence>
    </xsd:complexType>
    <xsd:complexType name="solutionDefn">
        <xsd:sequence>
            <xsd:element name="solutionID" type="xsd:string" />
            <xsd:element name="type" type="solutionType" />
            <xsd:element name="alias">
                <xsd:complexType>
                    <xsd:simpleContent>
                        <xsd:extension base="xsd:string">
                            <xsd:attribute   name="lcid"    type=
                                                            "xsd:
                                                            string"
use="required"/>
                        </xsd:extension>
                    </xsd:simpleContent>
                </xsd:complexType>
            </xsd:element>
            <xsd:element    name="solutionSpecific"    type=
```

Sample Manifest Schema (-continued)

```
                                                    "xsd:
                                                    string"
minOccurs="0" maxOccurs="1" />
            <xsd:element    name="file"   type="fileType"
                                              minOccurs="1"
maxOccurs="unbounded"/>
        </xsd:sequence>
    </xsd:complexType>
    <xsd:simpleType name="solutionType">
        <xsd:restriction base="xsd:string">
            <xsd:enumeration value="schema" />
            <xsd:enumeration value="transform" />
            <xsd:enumeration value="smartDocument" />
        </xsd:restriction>
    </xsd:simpleType>
    <xsd:complexType name="fileType">
        <xsd:all>
            <xsd:element    name="runFromServer"       type=
                                                       "xsd:
                                                       string"
minOccurs="0" maxOccurs="1"/>
            <xsd:element name="type" type="typeDefn" />
            <xsd:element       name="application"      type=
                                                       "xsd:
                                                       string"
minOccurs="0" maxOccurs="1" />
            <xsd:element name="version" type="xsd:string" />
            <xsd:element name="context" type="xsd:string"
                                              minOccurs="0"
maxOccurs="1" />
            <xsd:element name="filePath" type="xsd:string" />
            <xsd:element       name="installPath"      type=
                                                       "xsd:
                                                       string"
minOccurs="0" maxOccurs="1" />
            <xsd:element name="register" type="xsd:string"
                                              minOccurs="0"
maxOccurs="1" />
            <xsd:element name="CLSID" type="xsd:string"
                                              minOccurs="0"
maxOccurs="1" />
            <xsd:element name="progID" type="xsd:string"
                                              minOccurs="0"
maxOccurs="1" />
            <xsd:element          name="regsvr32"      type=
                                                       "xsd:
                                                       string"
minOccurs="0" maxOccurs="1" />
            <xsd:element name="regasm" type="xsd:string"
                                              minOccurs="0"
maxOccurs="1" />
            <xsd:element          name="registry"      type=
                                                       "registry
                                                       Type"
minOccurs="0" maxOccurs="1"/>
        </xsd:all>
    </xsd:complexType>
    <xsd:simpleType name="typeDefn">
        <xsd:restriction base="xsd:string">
            <xsd:enumeration value="template" />
            <xsd:enumeration value="smartTagList" />
            <xsd:enumeration value="solutionList" />
            <xsd:enumeration value="schema" />
            <xsd:enumeration value="transform" />
            <xsd:enumeration value="actionHandler" />
            <xsd:enumeration value="solutionActionHandler" />
            <xsd:enumeration value="recognizer" />
            <xsd:enumeration value="solutionRecognizer" />
            <xsd:enumeration value="solutionList" />
            <xsd:enumeration value="COMAddIn" />
            <xsd:enumeration value="assembly" />
            <xsd:enumeration value="XMLFile" />
            <xsd:enumeration value="installPackage" />
        </xsd:restriction>
    </xsd:simpleType>
    <xsd:complexType name="registryType">
        <xsd:all>
```

-continued

Sample Manifest Schema

```
            <xsd:element name="registryKey" type="registryKey
            Type"
minOccurs="1" />
        </xsd:all>
    </xsd:complexType>
    <xsd:complexType name="registryKeyType">
        <xsd:all>
            <xsd:element name="keyName" type="xsd:string" />
            <xsd:element name="keyValue" type="keyValueType" />
        </xsd:all>
    </xsd:complexType>
    <xsd:complexType name="keyValueType">
        <xsd:all>
            <xsd:element name="valueName" type="xsd:string" />
            <xsd:element name="valueType" type="registryValue-
            Type" />
            <xsd:element name="value" type="xsd:string" />
        </xsd:all>
    </xsd:complexType>
    <xsd:simpleType name="registryValueType">
      <xsd:restriction base="xsd:string">
            <xsd:enumeration value="REG_SZ" />
            <xsd:enumeration value="REG_EXPAND_SZ" />
            <xsd:enumeration value="REG_DWORD" />
      </xsd:restriction>
    </xsd:simpleType>
    <xsd:simpleType name="zeroAndPositiveInteger">
      <xsd:restriction base="xsd:integer">
            <xsd:minInclusive value="0" />
      </xsd:restriction>
    </xsd:simpleType>
</xsd:schema>
```

If the user has opened a software application 100 that requires the functionality of various components to transform the user's document 110 into a "smart" document, as described below, the mechanism of the present invention may be used to download all components required for that operation. In that case, an XML schema that describes the type(s) of files and data structures that together make up a solution to transform the user's document 110 into a "smart" document, as well as information about registering those components and installing them on the user's computer 20 may be stored on the manifest 38.

For example, if the user receives a document, such as a template, for the preparation of a resumé that "points" to a solution for providing helpful information, and actions, associated with completing the text and data fields of the template, the template or document received by the user may point to a remotely stored manifest 38 so that the user may download all files necessary for fully implementing the solution referred to by the document received by the user. For a detailed description of a method and system for creating, implementing and using "smart" documents such as the document 110, illustrated in FIG. 3, see U.S. Patent Application Publication No. 2003/0229608 entitled "Providing Contextually Sensitive Actions and Help Content In Computer-Generated Documents," which is incorporated herein by this reference as if fully set out herein.

Once the manifest 38 is created, and all of the necessary files are listed to implement a given solution, or to correct or improve the performance of a given application, a reference to the solution or updates may be made in the document, such as a word processing document, or spreadsheet document utilized by the user on the client-side computer 20. The manifest of files and solutions may be referred to by a solution or manifest ID to allow the user's client-side application and documents to point to and obtain information from, the remote manifest. The solution ID associated with software components pointed to by the document or application are stored in a solution property 115 attached to the document 110.

The location of the manifest 38, including required components and desired solutions, is referred to according to the solution location 118. The solution location 118 may include the URL of the manifest 38 on the remote web server 49. If the user only has the document, as in the case where the user has received the document from a friend via electronic mail, the application 100 may call the web server 49 via the solution location 118, and by utilizing the solution ID from the solution property 115, the application may obtain the manifest 38 to determine what components must be downloaded, installed, registered, and implemented to provide the user with required or desired functionality. Now, the user has the document 110 and a set of installed "ready to run" files and other components that the software document 110 needs to enable the proper operation of the software application 100 or to enable the application 100 to transform the document 110 into a "smart" document. Advantageously, the requirement to receive an installation package from the software developer containing software repairs or "patches" or containing necessary functionality to improve the performance of original functionality of the application is avoided.

Figure 2:
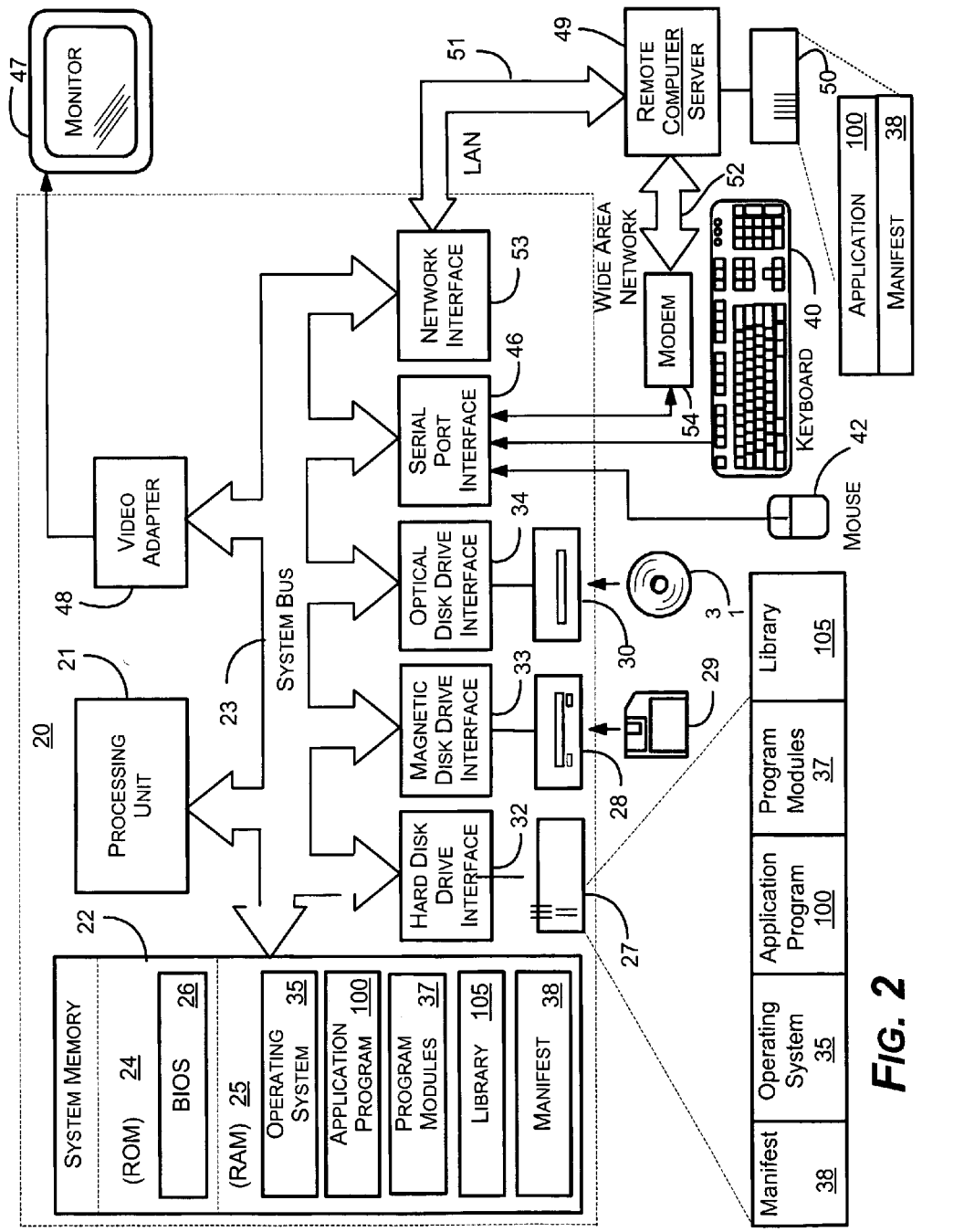
FIG. 2 is a block diagram of a computing system and associated peripherals and network devices that provide an exemplary operating environment for the present invention.

FIG. 2 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, cell phones, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 2, an exemplary system for implementing the invention includes a conventional personal computer 20, including a processing unit 21, a system memory 22, and a system bus 23 that couples the system memory to the processing unit 21. The system memory 22 includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 100, a word processor program module 37 (or other type of program module), program data, such as the manifest 38, and other program modules (not shown).

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 2. The logical connections depicted in FIG. 2 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 3:
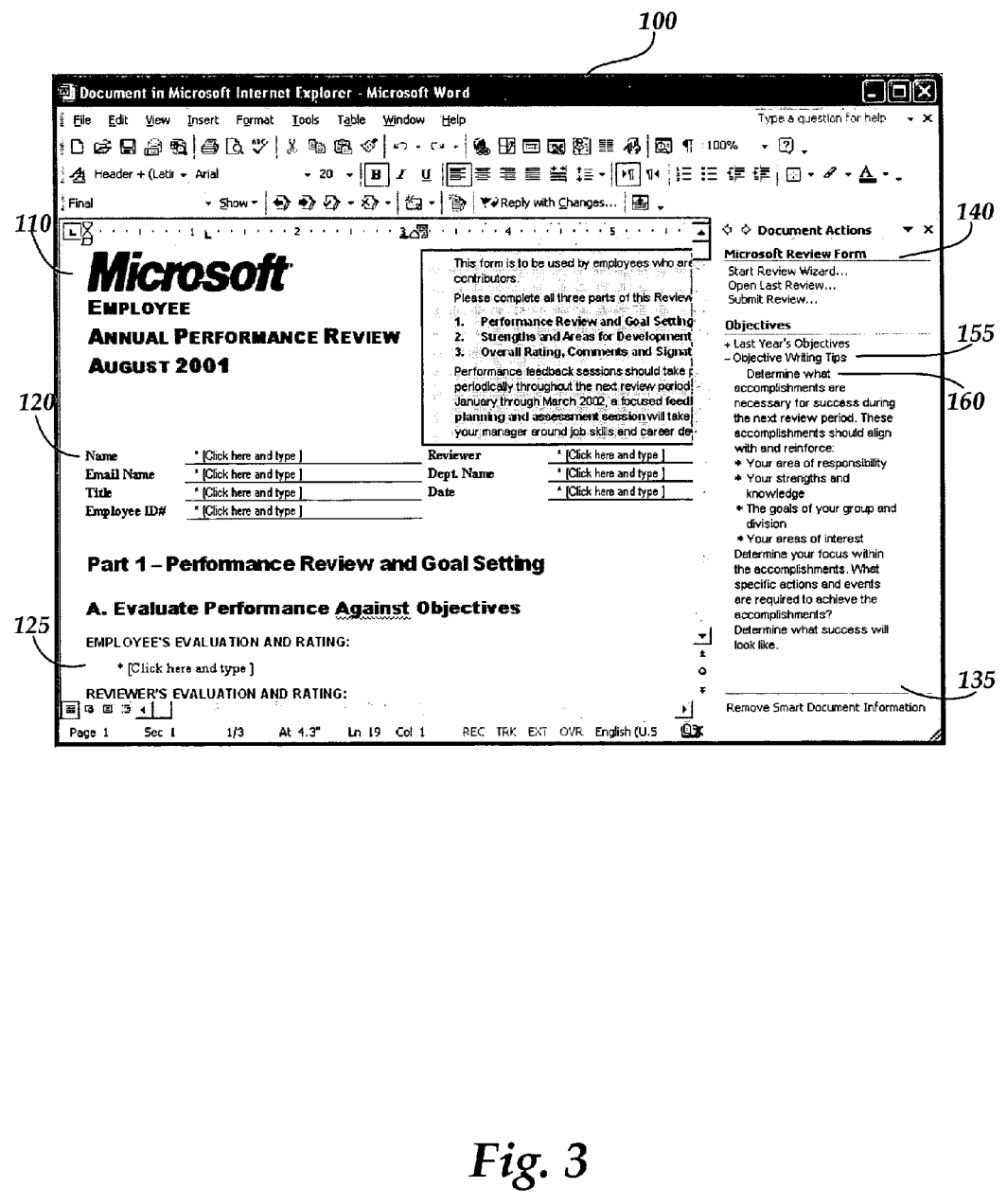

FIG. 3 is a computer screen display of a software application graphical user interface through which is displayed a document and associated contextually sensitive actions and help content according to an embodiment of the present invention. The document 110 illustrated in FIG. 3 represents a "smart" document that may point to functionality that may be downloaded from the manifest 38. The document 110 illustrated in FIG. 3 is described for purposes of example only and is not limiting of the invention described herein. The word processing application 100 provides typical functionality associated with a word processor accessible via drop down menus such as, File, Edit, View, Insert, Format, etc. The document 110 is displayed in the work area of the application 100, and a document actions pane 135 is illustrated to the right of the document 110.

When the user places her computer cursor within a particular section of the document 110, for example the "objectives" section 125 illustrated in FIG. 3, the user is provided with actions and help content in the document actions pane 135. For example, if the user places her computer cursor in the "objectives" section 125, the user may be provided with "Objective Writing Tips" 155 shown in the document actions pane 135. Selection of the "Objective Writing Tips" 155, as illustrated in FIG. 3, causes a display of "Objective Writing Tips" text 160 that provide the user with helpful information as to how to complete the "objectives" section in the document 110, illustrated in FIG. 3. If the user moves the cursor to a different section of the document, for example the personal information section 120, information provided in the document actions pane 135 will be provided to give the user assistance with the completion of the personal information section 120.

In addition to helpful information to assist the user, a variety of document actions 145 are provided. For example, the "Submit Review" action may allow the user to submit the completed document 110 to her supervisor or to her employee after completion of the document. The "Open Last Review" action may allow the user to open the last performance review so that she may determine whether she completed her objectives as set forth in the last review. If the document in use by the user is some other type of document, for example a resume document, helpful information in the document actions pane might include information on preparing the "education" section, the "experience" section, and/or the "personal information" section.

According to the present invention, and as described in detail below, when a user focuses on a particular portion of the document 110, such as the "objectives" section of the performance review 110 illustrated in FIG. 3, a solution property 115 points the document to the "objectives" section help solution illustrated in the document actions pane 135. The solution location 118 provides the document 110 and the application 100 with the location of the components, dlls, or XML files necessary for implementing that solution. As should be understood, exemplary components may include components for drawing the document actions pane 135, components for displaying the information associated with the particular context, in this case the "objectives" section, and components for executing document actions such as "Submit Review" action 145. If the components needed by the application 100 and document 110 to provide the "smart" functionality described above have not been downloaded to the user's computer 20, then these components may be downloaded to the computer 20 in accordance with the present invention as described below.

Figure 4:
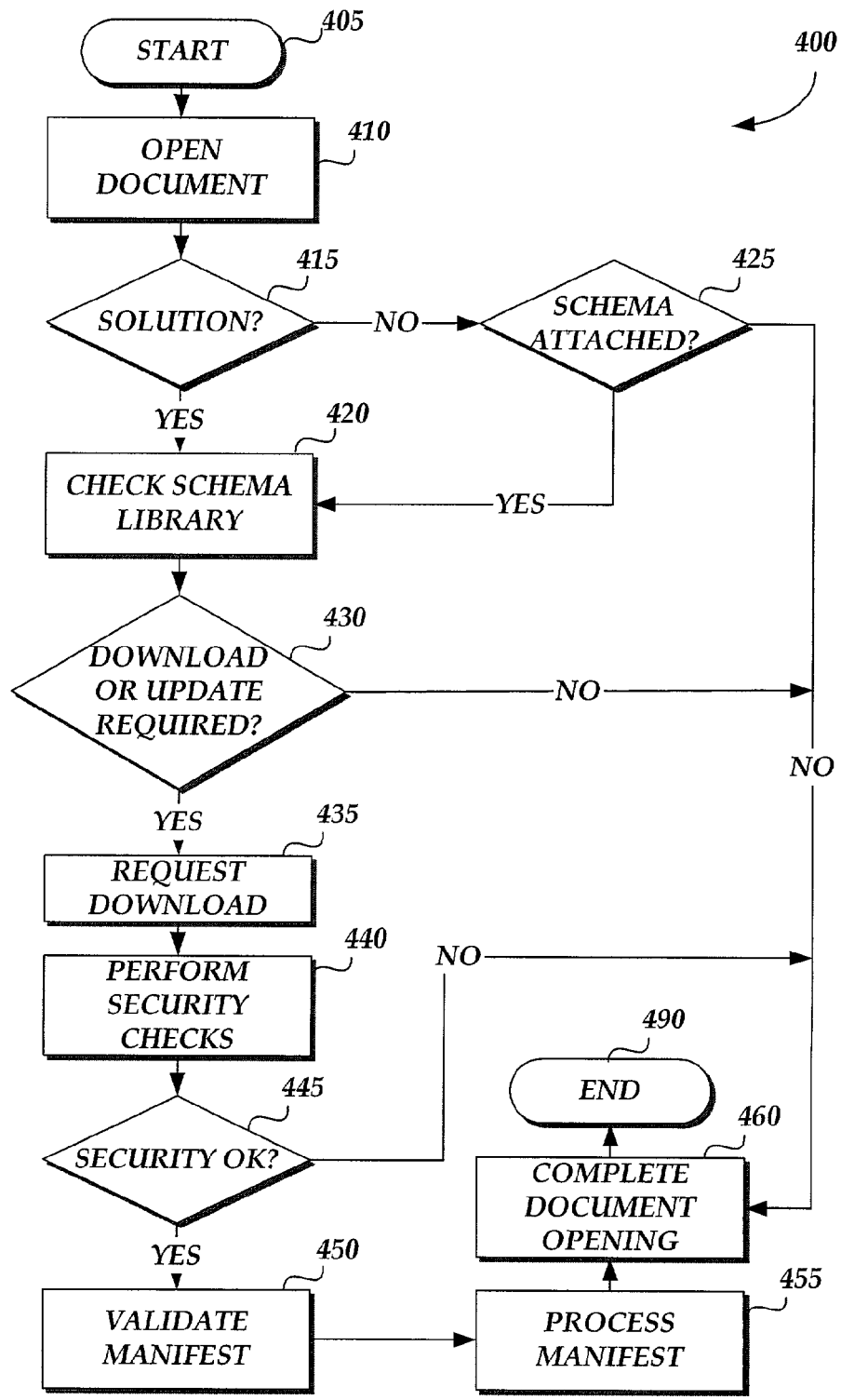
FIG. 4 is a flow chart illustrating a method for downloading components required for operating and for providing functionality to a client-side software application.

FIG. 4 is a flow chart illustrating a method for downloading components required for operating and for providing functionality to a client-side software application. As described above, the embodiments of the present invention provide for downloading all components, files, sub-routines, Extensible Markup Language files, and file implementation information necessary for the operation of the software application 100 on the user's computer 20. The embodiments of the present invention also provide for downloading all necessary components, files, XML schema, and associated XML files required by an application 100 for transforming a document 110 into a "smart" document.

The method 400 for downloading required components and files to the user's computer 20, begins at start step 405, and proceeds to step 410 where the application 100 is booted by the user, and the document 110 is opened for editing by the user. According to an embodiment of the present invention, the document 110 opened by the user may be any document that points to required components and files for operation of the document 110 via the application 100, or the document may be a "smart" document that points to a solution that may be downloaded to provide enhanced functionality to the document, as described above with reference to FIG. 3.

At step 415, the application 100 determines whether the document 110 points to or refers to components, sub-routines, or files that are necessary for the operation of the application 100, or whether the document 110 points to a solution that may be downloaded to the user's computer 20 to provide additional functionality to the application 100 for editing the document 110. According to an embodiment of the present invention, a schema is attached to a document 110 that defines permissible data content, data type and data structure from the document. The document is structured to associate the document with the schema. A solution comprising components and files needed to provide functionality to the application or to transform the application into a "smart" document is associated with the document structure.

According to another embodiment of the invention, an Extensible Markup Language (XML) schema is attached to the document to define permissible data content, data types and data structures for the document. Particular portions of the document are annotated with XML structure associated with the schema. A solution comprising a plurality of software components is associated with XML elements making up the XML structure. The document is enabled to call the solution to obtain functionality provided by the plurality of software components assembled on the manifest 38 upon initiation of editing the document within an XML element associated with a particular solution.

Figure 5:
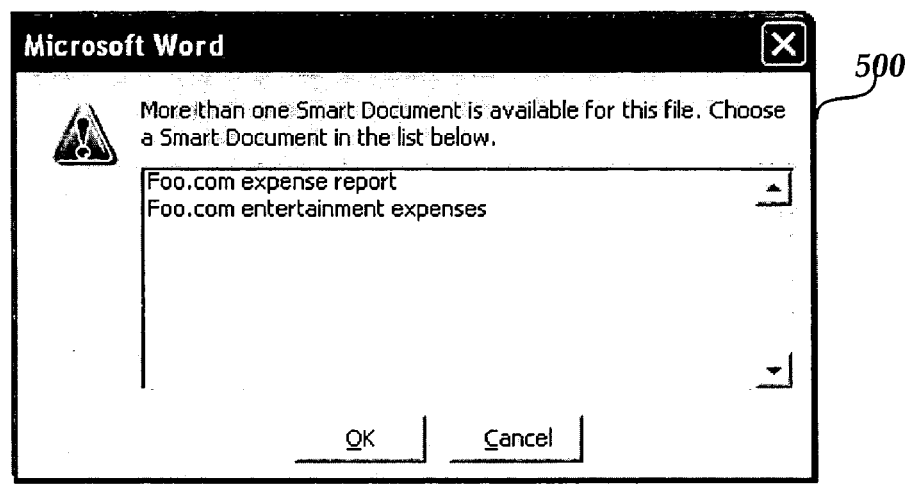
FIG. 5 illustrates a computer-generated dialog box for offering multiple document solutions to the user.

If the document 110 points to various components and files necessary for the operation of the application 100 and for editing the document 110, or if the document points to a solution that may be downloaded to transform the document into a "smart" document, the method proceeds to step 420, and the application 100 checks the schema library 105 resident on the user's computer 20 for the presence of the necessary components or files. If the document includes solution properties pointing to more than one solution, the user of the document may be prompted to select one of the solutions for downloading from the remote server via a prompt such as the dialog box 500, illustrated in Fig. 5.

Referring back to step 415, if the document does not refer to a solution for transforming the document into a "smart" document, the method may proceed to step 425, where a determination is made as to whether a schema has been attached to the document. If the document has an attached schema, but no reference to a particular solution, the method proceeds to step 420, and the schema library 105 is checked for the presence of components associated with the schema attached to the document 110. If a determination is made that the document does not refer to any required components or files, or that the document does not have an attached schema, the method proceeds to step 460, and the document is opened in accordance with normal document opening procedures according to the document application 100.

Referring back to step 420, at the schema library 105, a determination is made as to whether the schema library 105 includes files associated with the application 100 and the document 110. A determination as to whether a solution is present in the schema library 105 that is referred to in the document 110 is made by looking for component or solution IDs referred to in the solution properties 115 in the document 110.

Figure 6:
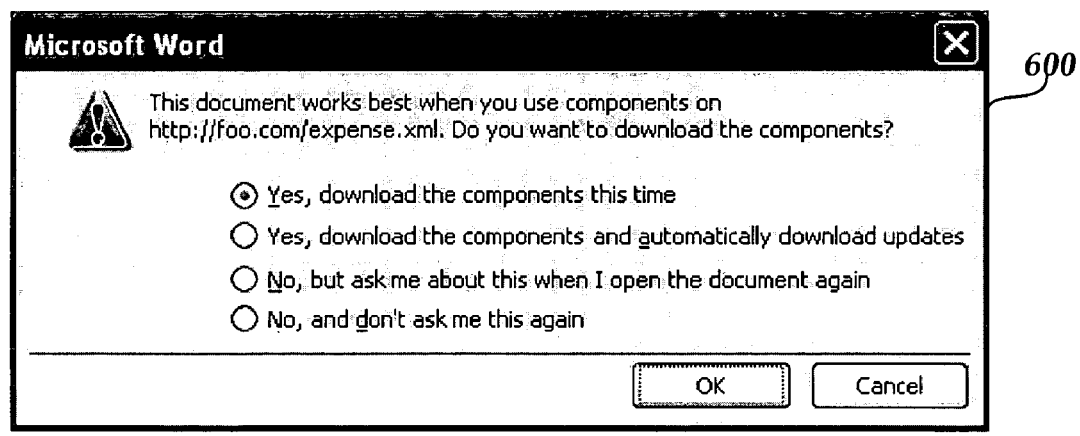
FIG. 6 illustrates a computer-generated dialog box for assisting a user with downloading components required by a software application.

At step 430, a determination is made as to whether a download of components, files, sub-routines, or information related thereto should be downloaded to the user's computer 20 to update existing components or to add additional functionality to transform the document 110 into a "smart" document. In order to make the determination as to whether components should be updated, or as to whether additional functionality should be downloaded from the manifest 38, the user may be provided with a prompt, such as the dialog box 600, illustrated in FIG. 6. The dialog box may inform the user that components necessary for the proper operation of the application 100 may have been updated or repaired recently, or that the document she is currently editing will work better if the user downloads components from a given web server site. As shown in the dialog box 600, the user may be provided with a variety of options including acceptance of a download of components, acceptance of automatically downloading future updates, or the user may decline the downloading of updates or components.

A registry key may be written into the computer's registry so that when the application boots, a query can be sent to the manifest 38 via the remote server 49 to determine whether new functionality has been added to the manifest 38 that is associated with the application 100 or with solutions being used by the application 100 to transform the application into a "smart" document. Alternatively, the manifest 38 may include a timing mechanism that contacts the user after a set amount of elapsed time to notify the user to check for updates to files or functionality contained on the manifest 38. The amount of time between checks for updates to the manifest 38 may be set by the creator of the manifest 38 or by the user of the application 100, as described below. Alternatively, the application 100 can be programmed to call or "ping" the server 49 on some regular frequency to determine whether any software component updates or additions are available. Alternatively, the user may request software component updates to be downloaded from the manifest 38 upon user demand, or the user may choose to have updates downloaded on some regular frequency, such as application boot-up, or daily, weekly, etc. According to an embodiment, the user may be provided with a user interface for choosing the frequency of download from the manifest 38.

Figure 7:
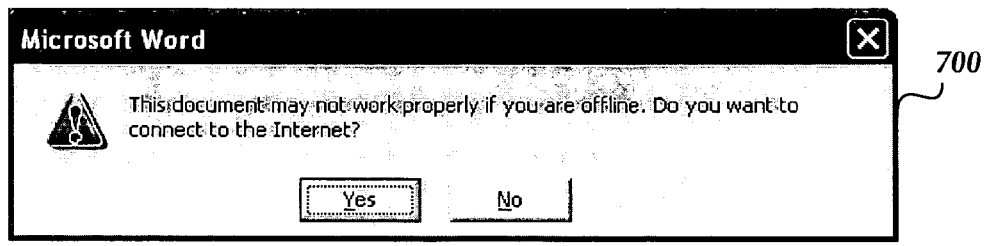
FIG. 7 illustrates a computer-generated dialog box for prompting a user of the need to connect to the internet for downloading components according to an embodiment of the present invention.

At step 435, if the user decides to download updates to existing files or components or new functionality to transform the document 110 into a "smart" document, the user requests the download of the suggested files or functionality, and the application 100 connects to the remote server 49 to request the required files or updates from the manifest 38. In order to connect the application 100 to the remote server 49 to obtain downloaded information from the manifest 38, the application 100 may launch an instance of an Internet browser capable of connecting the user's computer 20 to the remote server 49. Alternatively, the functionality may be integrated into the application 100 for connecting to the remote server 49 in the same manner as an Internet browser would connect to the remote server 49 to download information directly to the application 100 via the user's computer 20. If the user's computer 20 is not adapted for on-line communication, a prompt such as the dialog box 700 illustrated in FIG. 7 may be provided to the user to inform the user that the document may not work properly if the user is off-line.

As should be understood, the call made from the application 100 to the manifest 38 located on the remote server 49 may be made based on a uniform resource locator (URL) designated for obtaining updates to existing files or new functionality and attached to the document at the solution location 118, illustrated in FIG. 1. Alternatively, the user may have a set of URLs from which to obtain updates to software components or additional functionality, and the user may enter one or more of those URLs in response to a prompt informing the user that updating the software components provisioned for her application 100 may be helpful. Alternatively, the user may decide without being prompted to cause the application 100 to call the manifest 38 to obtain software component updates and additions. According to this embodiment, a function tool may be provided in the application 100 that allows the user to enter the URL of a manifest 38 from which the user desires to obtain software component updates or functionality additions.

Figure 8:
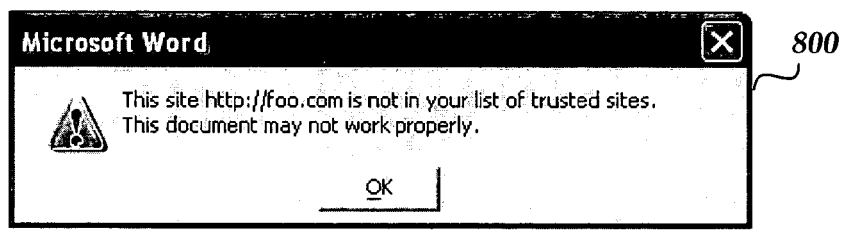
FIG. 8 illustrates a computer-generated dialog box for warning a user of a potential security risk associated with downloading components to the user's computer.
Figure 9:
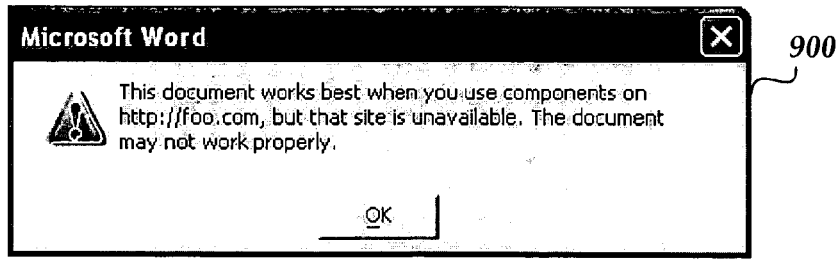
FIG. 9 illustrates a computer-generated dialog box for alerting a user of a problem associated with downloading components required by the user's software application.

Once the user has requested the download of software component updates or functionality additions for use by the application 100, the method proceeds to step 440 and a number of security checks are performed to ensure that the user receives the downloaded files and updates from a trusted source. If the document refers to a manifest 38 via a server site that is on the user's list of trusted sites, or if the manifest is requested from a site on the user's trusted intranet system, then the download of the requested or accepted files or updates may be performed. If the URL at which the manifest 38 is located is not a trusted site or in the user's trusted Intranet system, the user may be notified with a prompt such as the dialog box 800, illustrated in FIG. 8, to notify the user that the site being called is not on the user's list of trusted sites or is not coming via the user's trusted intranet system. The user may then choose to either accept a download of information from the manifest 38 or decline the download in response to the prompt. If the document refers to a manifest 38 that is on a trusted site or that is available via a trusted Intranet system, but where the site containing the manifest 38 is not available, the user may be notified with a prompt such as the dialog box 900 illustrated in FIG. 9 that the site is currently unavailable and that the download of information is likewise not available.

An additional security check that may be performed after the download, but prior to installing components, includes preparing a checksum value of the information provided by the manifest 38 and comparing that to a checksum value prepared for the downloaded information at the user's computer 20. If the two values do not match, the installation to the user's computer 20 is prevented because the variation in the checksum values may be an indication that unauthorized tampering with the contents of the downloaded files occurred in transit to the user's computer 20.

In addition to the foregoing security checks, digital signatures may also be utilized to check the security of files downloaded from the manifest 38. That is, files contained on the manifest 38 may be enhanced with a digital signature of the creator or administrator of those files that may be checked at the remote server 49 or at the user's computer 20 against a list of trusted digital signatures prior to downloading and/or installing information from those files. If any of the foregoing security checks fail to ensure the validity and security of the files contained in the manifest 38, the method proceeds to step 460, and document opening is completed without downloading any additional components or file updates. That is, the document opens and operates without the benefit of new functionality or updates to existing functionality that may be available from the manifest 38. Alternatively, the user may override the security system and accept the downloaded information even if the security check indicates that the information is not coming from a trusted site if the user is otherwise confident that the downloaded information may be trusted.

Referring back to step 445, if the security checks pass, the method proceeds to step 450 where a validation of the contents of the manifest 38 is performed. Before downloading components or information from the manifest to the user's computer 20, a comparison is made between the components and information contained in the manifest 38 (pointed to by the document 110) and the components and information already present in the schema library 105. If the components and information on the manifest 38 does not differ from the components and information already available to the application via the schema library 105, then the download from the manifest 38 may be avoided.

The validation of the manifest 38 includes a determination of which components or information regarding those components are pointed to by the document 110 via the application 100. That is, a solution referred to by the document 110 may require additional functionality, and the solution may point to particular components contained on the manifest 38, but not point to all components contained on the manifest 38. Accordingly, at step 450, a determination is made as to the number of components and the content of information related to those components that should be downloaded to the user's computer 20 for integration with the application 100.

At step 455, the manifest 38 is processed. Processing the manifest 38 includes actually downloading files, components, subroutines, and related information pointed to by the document 110 or application 100. Once the required files are downloaded to the user's computer 20, those files are installed and registered with the operating system of the computer 20. As should be understood by those skilled in the art, any required registry keys or set-up actions necessary to ensure that the downloaded files properly correspond with the application 100 to provide the required functionality are performed at step 455. After all required files are downloaded from the manifest 38, opening the document 110 is completed with the additional or updated functionality provided by the downloaded file updates or file additions. The method ends at step 490.

Once the document 110 is opened after the download of component updates or additions, the user of the document now has all available functionality downloaded onto the user's computer 20. If the document is a "smart" document as illustrated with reference to FIG. 3, the document will provide the user with all the normal functionality required for operating the document, and additionally, the user will have useful help content and document actions based on the editing context within the document. For example, if the user has opened a resume template, the user may receive help content and document actions based on the position of the user's computer cursor in a section of the document. In addition to pointing to the solution ID for obtaining the solution for use by the document, the document will point to the solution location from where the software components or software component upgrades may be downloaded to upgrade or add to the functionality in use by the document. Accordingly, with the present invention, the user may readily obtain downloaded updates and additions to the functionality available for use with the document being edited.

Moreover, if the user would like to send the document to a second user, there is no need to send the second user an installation package containing all the software components necessary to give the document the enhanced or "smart" functionality. Once the second user opens the document, the second user will be notified that the document will work more efficiently if the user downloads software components from the manifest 38, as discussed with reference to FIG. 4. If the downloaded information is accepted, the document will then have all the available functionality on the second user's computer 20 that it had on the computer of the first user.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method of downloading software components from a remote source to a software application for providing updates or additions to application and document functionality, comprising the steps of:
    attaching a schema to a document defining permissible data content, data type and data structure for the document;
    structuring the document to associate the document with the schema;
    associating a solution with the document structure;
    assembling a plurality of software components comprising the solution at a location remote from the document;
    enabling the document to call the solution to obtain functionality provided by the plurality of software components upon initiating of editing the document within a schema element associated with a particular solution, whereby the step of enabling the document to call the solution to obtain functionality provided by the plurality of software components includes:
        attaching a solution property to the document for pointing the
        document to the solution, whereby the step of attaching a solution property to the document further comprises attaching a plurality of solution properties to the document to associate a plurality of subsets of the solution with particular portions of the document; and
        attaching a solution location to the document for enabling the
        document to locate the solution at the remote location;
    listing the solution and the plurality of software components in a manifest of software components; and
    storing the manifest in a remote library of software components on a remote server accessible by the document;
    attaching a schema to the manifest for defining permissible data content, data type and data structure of the manifest and for associating the solution with the document;
    determining whether the plurality of software components for providing the solution is present in a local library of software components;
    if the plurality of software components is not present in the local library of software components, calling the manifest at the remote library of software components for obtaining the solution; and
    downloading the plurality of software components to the application for provision of the functionality to the document.

2. The method of claim 1, whereby the solution location includes a uniform resource locator (URL) for the solution.

3. The method of claim 1, prior to the step of determining whether the plurality of software components for providing the solution is present in a local library of software components, further comprising determining whether the document includes solution properties pointing to more than one solution.

4. The method of claim 3, whereby if the document includes solution properties pointing to more than one solution, selecting for downloading from the remote server software components associated with one of the more than one solutions.

5. The method of claim 1, prior to the step of downloading the software components to the application, receiving a query to determine whether the plurality of software components should be downloaded.

6. The method of claim 5, whereby the step of receiving a query to determine whether the plurality of software components should be downloaded, includes receiving a notification that the plurality of software components have been updated at the remote server.

7. The method of claim 6, further comprising: causing the notification to be sent from the manifest upon the occurrence of an update to any of the plurality of software components.

8. The method of claim 7, further comprising:
    causing the notification to be sent from the manifest at a prescribed frequency.

9. The method of claim 8, whereby the prescribed frequency is set by the creator of the manifest.

10. The method of claim 6, whereby the step of receiving a query to determine whether the plurality of software components should be downloaded, includes receiving a notification that additional software components have been added to the plurality of software components stored at the remote server.

11. The method of claim 6, whereby the step of receiving a query to determine whether the plurality of software components should be downloaded, includes receiving a notification that a set amount of time has elapsed since the last download of the plurality of software components to the application.

12. The method of claim 1, prior to the step of downloading the software components to the application, receiving at the remote server a command from the application to download the software components to the application.

13. The method of claim 5, whereby a command from the application to download the software components to the application is initiated by a user of the application.

14. The method of claim 1, prior to the step of downloading the software components to the application, connecting the software application to the remote server.

15. The method of claim 14, whereby the step of connecting the software application to the remote server includes connecting the software application to the remote server via the Internet.

16. The method of claim 14, whereby the step of connecting the software application to the remote server includes connecting the software application to the remote server via an intranet.

17. The method of claim 14, whereby the step of connecting the software application to the remote server includes connecting the software application to the remote server via a distributed computing environment.

18. The method of claim 17, whereby the distributed computing environment includes a wireline telecommunications network.

19. The method of claim 17, whereby the distributed computing environment includes a wireless telecommunications network.

20. The method of claim 14, whereby the step of connecting the software application to the remote server includes connecting the software application to the remote server via a local area network.

21. The method of claim 1, prior to downloading the software components to the document, performing a security check of the manifest.

22. The method of claim 21, whereby if the security of the manifest cannot be checked, preventing the step of downloading the software components to the document.

23. The method of claim 22, whereby the step of checking the security of the manifest includes determining whether the manifest is located at a trusted remote site.

24. The method of claim 22, whereby the step of checking the security of the manifest includes determining whether the manifest is from a trusted intranet.

25. The method of claim 22, whereby the step of checking the security of the manifest includes determining whether a digital signature applied to the manifest matches a trusted digital signature.

26. The method of claim 25, whereby the digital signature applied to the manifest includes a particular digital signature applied to each of a plurality of files included on the manifest.

27. The method of claim 14, after the step of connecting the software application to the remote server, further comprising:
 obtaining a checksum value representing the contents of the manifest;
 comparing the checksum value representing the contents of the manifest with a checksum value representing the contents of the manifest after the contents of the manifest have been received by the application, but before the contents of the manifest have been installed for use by the application; and
 if the checksum value representing the contents of the manifest differs from the checksum value representing the manifest after the manifest has been received by the application, preventing the step of downloading the software components to the document.

28. The method of claim 14, after connecting the software application to the remote server, and before downloading the plurality of software components to the application for provision of the functionality to the document, determining which components of the plurality of components are required by the application to provide a solution pointed to by the solution property.

29. The method of claim 28, after the step of determining which components of the plurality of components are required by the application, further comprising:
 comparing the components present in the manifest that are required by the application with components that are present in the local library of software components;
 if the components present in the manifest that are required by the application are in addition to the components present in the local library, downloading the software components to the application; and
 if the components present in the manifest that are required by the document are the same as the components that are present in the local library, but the components that are present in the manifest that are required by the document are of a newer version than the components that are present in the local library, downloading the software components to the application.

30. The method of claim 1, after downloading the software components to the application, installing the downloaded components for use by the application for providing functionality to the document.

31. A method of downloading software components from a remote source to a software application for providing updates or additions to application and document functionality, comprising the steps of:
 attaching an Extensible Markup Language (XML) schema to the document defining permissible data content, data types and data structures for the document;
 annotating particular portions of the document with XML structure associated with the permissible data content, the permissible data types, and permissible data structures for the particular portions of the document as defined by the schema;
 associating a solution with XML elements comprising the XML structure;
 assembling a plurality of software components comprising the solution at a location remote from the document;
 enabling the document to call the solution to obtain functionality provided by the plurality of software components, whereby enabling the document to call the solution to obtain functionality provided by the plurality of software components includes enabling the document to call the plurality of software components upon initiation of editing the document within an XML element associated with a particular solution, attaching a solution property to the document for pointing the document to the solution, and attaching a solution location to the document for enabling the document to locate the solution at the remote location;
 listing the solution and the plurality of software components in a manifest of software components;
 storing the manifest in a remote library of software components on a remote server accessible by the document; and
 downloading the plurality of software components to the application for provision of the functionality to the document, whereby the solution provides help content and document actions to the document via the application.

32. The method of claim 31, whereby the solution location includes a uniform resource locator (URL) for the solution.

33. The method of claim 31, prior to the step of downloading the software components to the application, querying a user of the document to determine whether the plurality of software components should be downloaded.

34. The method of claim 31, prior to downloading the software components to the document, further comprising:
 determining whether the manifest is located at a trusted remote site; and if the manifest is not located at a trusted remote site, preventing the step of downloading the plurality of software components to the application.

35. The method of claim 31, before downloading the plurality of software components to the application for provision of the functionality to the document, further comprising:
 connecting the software application to the remote server;
 determining which components of the plurality of components are required by the application to provide a solution pointed to by the solution property;
 comparing the components present in the manifest that are required by the application with components that are present in the local library of software components;

if the components present in the manifest that are required by the application are in addition to the components present in the local library, downloading the software components to the application; and if the components present in the manifest that are required by the document are the same as the components that are present in the local library, but the components that are present in the manifest that are required by the document are of a newer version than the components that are present in the local library, downloading the software components to the application.

36. A computer readable medium having stored thereon computer-executable instructions which when executed by a computer, perform the steps of:

attaching an Extensible Markup Language (XML) schema to the document defining permissible data content, data types and data structures for the document;

annotating particular portions of the document with XML structure associated with the permissible data content, the permissible data types, and permissible data structures for the particular portions of the document as defined by the schema;

associating a solution with XML elements comprising the XML structure;

assembling a plurality of software components comprising the solution at a location remote from the document;

enabling the document to call the solution to obtain functionality provided by the plurality of software components, whereby enabling the document to call the solution to obtain functionality provided by the plurality of software components includes enabling the document to call the plurality of software components upon initiation of editing the document within an XML element associated with a particular solution, attaching a solution property to the document for pointing the document to the solution, and attaching a solution location to the document for enabling the document to locate the solution at the remote location;

listing the solution and the plurality of software components in a manifest of software components;

storing the manifest in a remote library of software components on a remote server accessible by the document;

downloading the plurality of software components to the application for provision of the functionality to the document, whereby the solution provides help content and document actions to the document via the application.

37. The computer readable medium of claim 36, prior to the step of downloading the software components to the application, further performing the steps of:

opening the document;

placing a computer cursor in a particular portion of the document;

generating a list of XML elements enclosing a position of the cursor;

determining whether a solution property pointing the document to the solution is associated with the list of XML elements; and determining whether the plurality of software components for providing the solution is present in a local library of software components; and if the plurality of software components is not present in the local library of software components, calling the manifest at the remote library of software components for obtaining the solution.

38. The computer readable medium of claim 37, whereby the step of determining whether a solution property pointing the document to the solution is associated with the list of XML elements, further comprises the step of parsing a look-up table of solutions to determine if any available help content or document actions are associated with any XML element in the list of XML elements.

39. The computer readable medium of claim 36, prior to the step of downloading the software components to the application, querying a user of the document to determine whether the plurality of software components should be downloaded.

40. The computer readable medium of claim 36, prior to downloading the software components to the document, further performing the steps of:

determining whether the manifest is located at a trusted remote site; and if the manifest is not located at a trusted remote site, preventing the step of downloading the plurality of software components to the application.

41. The computer readable medium of claim 36, before downloading the plurality of software components to the application for provision of the functionality to the document, further performing the steps of:

connecting the software application to the remote server;

determining which components of the plurality of components are required by the application to provide a solution pointed to by the solution property;

comparing the components present in the manifest that are required by the application with components that are present in the local library of software components;

if the components present in the manifest that are required by the application are in addition to the components present in the local library, downloading the software components to the application; and if the components present in the manifest that are required by the document are the same as the components that are present in the local library, but the components that are present in the manifest that are required by the document are of a newer version than the components that are present in the local library, downloading the software components to the application.

* * * * *